United States Patent [19]
Tsuji et al.

[11] Patent Number: 4,935,759
[45] Date of Patent: Jun. 19, 1990

[54] SYSTEM FOR CONTROLLING AN ILLUMINATING ANGLE OF A FLASHLIGHT

[75] Inventors: Kenji Tsuji; Makoto Kamiya, both of Osaka, Japan

[73] Assignee: Minolta Camera Kabushiki Kaisha, Osaka, Japan

[21] Appl. No.: 350,469

[22] Filed: May 11, 1989

[30] Foreign Application Priority Data

May 16, 1988 [JP] Japan .................. 63-119751

[51] Int. Cl.$^5$ ............................................. G03B 15/05
[52] U.S. Cl. ................................................. 354/149.1
[58] Field of Search ...................................... 354/149.1

[56] References Cited

U.S. PATENT DOCUMENTS

| | | | |
|---|---|---|---|
| 4,423,940 | 1/1984 | Kashihara et al. | 354/149.1 |
| 4,512,644 | 4/1985 | Yoshida | 354/149.1 |
| 4,743,929 | 5/1988 | Taniguchi et al. | 354/127.1 |
| 4,812,727 | 3/1989 | Sakai et al. | 318/696 |

FOREIGN PATENT DOCUMENTS 63-195632 8/1988 Japan .

*Primary Examiner*—Michael L. Gellner
*Attorney, Agent, or Firm*—Burns, Doane, Swecker & Mathis

[57] ABSTRACT

A system for controlling an illuminating angle of a flashlight includes a stepping motor by which a relative position between a panel and a reflector is controlled to change the illuminating angle. Further, in setting the illuminating angle, the widest angle is set as the starting point, and whereby an unevenness of exposure is not caused though a sudden photography operation is performed.

26 Claims, 22 Drawing Sheets

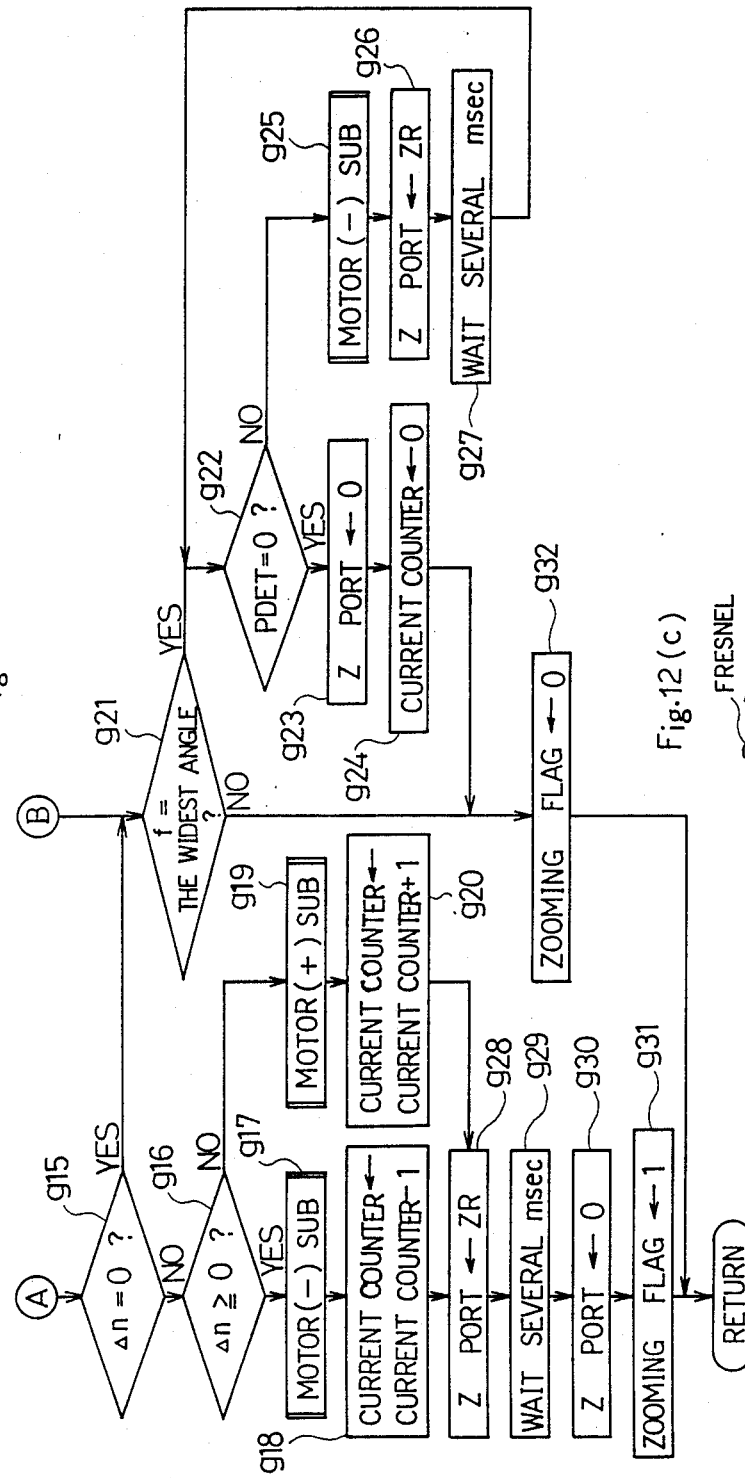
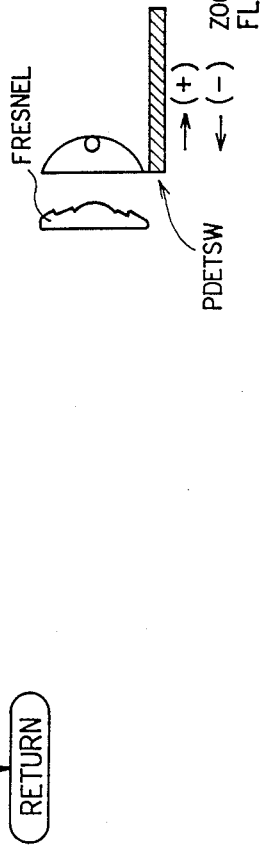

SYSTEM FOR CONTROLLING AN ILLUMINATING ANGLE OF A FLASHLIGHT

BACKGROUND OF THE INVENTION AND RELATED ART STATEMENT

The present invention relates to a system for controlling an illuminating angle of a flashlight.

Such a system conventionally known is a system in which an illuminating angle of a flashlight is controlled according to a focal length of a photographing lens and the like. Since the illuminating angle is controlled by moving a illumination panel, a reflector, and the like, it is required to detect a position of the reflector and the like in order to set a desired illuminating angle. Conventionally, since the positions of the illumination panel and the like are detected by using a code board and a slice contacted therewith, there are the following shortcomings:

That is, as a result of robbing the code board and the slice together, the system is poor for durability and the improvement therefor makes it costly.

Further, it is necessary to make the code pattern sizable in order to certainly contact the code board with the slice. Furthermore, concretely speaking, the system is constructed in such a manner that the motor is stopped when the slice contacts with the code pattern. It is found in such construction that even if the motor is braked, it still more rotates by the force of inertia, thereby the slice passing over the code pattern. When the slice passes over the code pattern, means for controlling the position of the panel and the like drives the motor so as to move the panel and the like in the reverse direction. Similarly when the slice passes over the code pattern, the same operations as the abovementioned are repeated, with the result that the panel and the like are moved back and forth. For the purpose of preventing this annoying moving, it is necessary to make the code pattern sizable as described above.

On the other hand, making the code pattern larger causes the system itself to be enlarged and moreover, not making it larger causes to decrease the number of detecting points. When the number thereof is a few, the precise control is not able to be performed and thus waste light results in illuminating an object. For example, if the detecting points are 35 mm, 50 mm, and 70 mm in the focal length of the photographing lens, in case of employing the photographing lens of the focal length 40 mm, the illuminating angle must cover the view angle of the lens with the focal length 35 mm (it is wider than the view angle of the lens with the focal length 40 mm) and thus, the unnecessary light which is not used to photograph an object results in illuminating.

Furthermore, when the system is constructed in such a manner that the positions of the illumination panel and the like is detected by using the code board and the slice, it is necessary to provide many members including the code board, the slice, the members for supporting them, the lead wires connected to the code board, and the like, thereby the number of parts also increasing.

SUMMARY OF THE INVENTION

It is an object of the present invention to provide a system for controlling an illuminating angle of a flashlight correctly and precisely, which is superior to existing systems for durability and inexpensive to manufacture.

In order to accomplish the above object, a system for controlling an illuminating angle of a flashlight according to the present invention controls the illuminating angle by driving a stepping motor. Hereby, it is unnecessary to use a code board, a slice, and the like, with the result that the durability of the system is improved and it is possible to control an illuminating angle accurately and precisely. Furthermore, the number of parts is cut and then, the cost of manufacturing decreases.

Further, this system may illuminate a flashlight without loss so that the longer the focal length is (the narrower the view angle is), the larger the flash illumination amount (the guide number) is, and shorten the charge time for obtaining a necessary illumination amount.

Furthermore, in this system, if the illuminating angle is designed to be automatically set to the widest angle after the predetermined time passes from the completion of an operation, the following effects are obtained: Even if the illuminating angle is not changed in time due to a suddenly photographing action, the flashlight is widely illuminated, thereby the unevenness of exposure being not caused.

BRIEF DESCRIPTION OF THE DRAWINGS

Now the present invention will be described below with reference to the appended drawings, in which.

DETAILED DESCRIPTION OF PREFERRED EMBODIMENTS OF THE INVENTION

Figure 1:
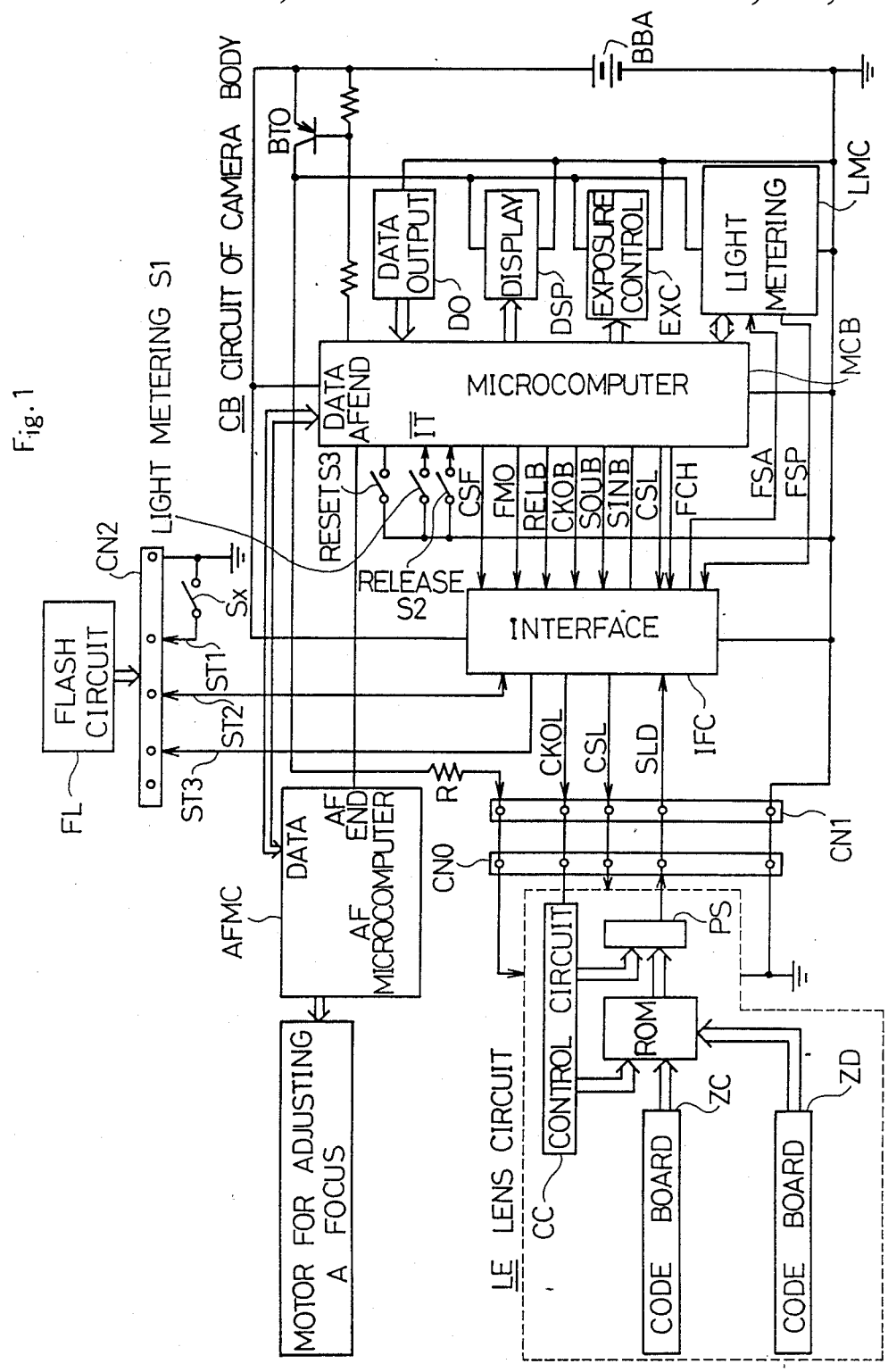
FIG. 1 is an whole circuit diagram of a camera system according to an embodiment of the present invention.

FIG. 1 is a whole circuit diagram of a camera system according to an embodiment of the present invention. In FIG. 1, CB designates a circuit in the camera body (hereinafter referred to as a camera circuit) and LE designates a circuit (hereinafter referred to as a camera circuit) in an interchangeable lens which is free to be mounted. FL designates a circuit for a flashlight (hereinafter referred to as a flash circuit) which is shown in detail in FIG. 4. The lens circuit LE and the camera circuit CB are interconnected through connectors CN0 and CN1. The flash circuit FL and the camera circuit CB are interconnected through connectors CN2 and CN3 (the connectors CN3 appears in FIG. 4). Each of these circuits is interlockingly operated.

Now, the operation and the constitution of the above-mentioned circuits will be described with reference to flow charts shown in FIGS. 2 and 3.

In the following description, signal names of lines are also used as terminal names through which the signals passes and as to two-valued level voltages, a high level voltage is represented by "H" and a low level voltage by "L".

Figure 2:
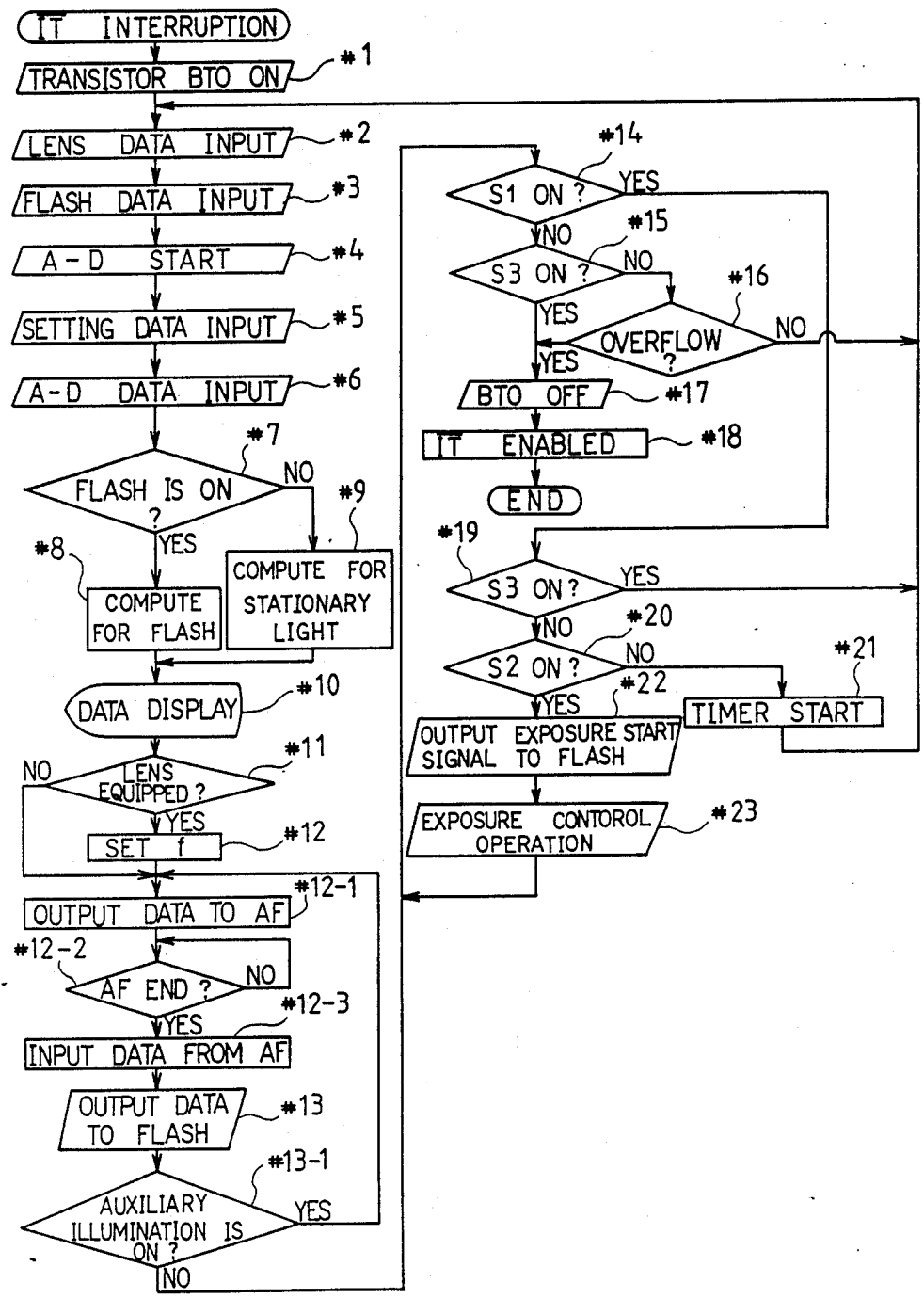
FIG. 2 is a flow chart showing a control operation of a microcomputer in the camera circuit CB.
Figure 3:
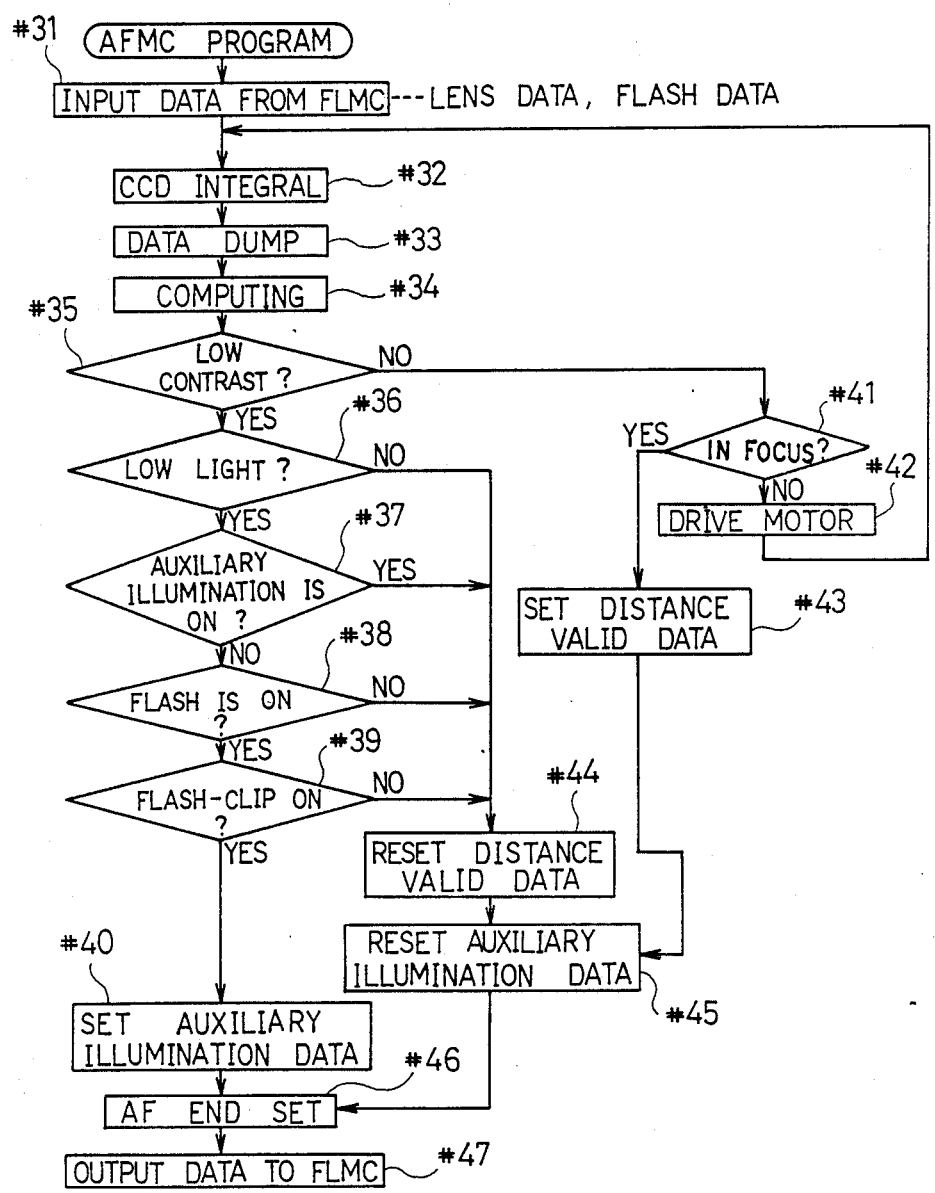
FIG. 3 is a flow chart of an operation of the microcomputer AF.

FIG. 2 is a flow chart showing the control operation of a microcomputer MCB which serves as a main part in the camera circuit CB.

In a camera circuit CB as shown in FIG. 1, if a light metering switch S1 is closed by the first stage depressing of a release button, a interrupt terminal $\overline{IT}$ of the microcomputer MCB turns to "L", and the operation of the microcomputer MCB starts from the Step 1 in FIG. 2 (hereinafter the step is written with #). In #1, a transistor BT0 conducts and then, the lens circuit LE is supplied with electricity through a protect resistor R and, at the same time, a display circuit DSP, an exposure control circuit EX, and a light metering circuit LMC, each of which is provided in the camera circuit, are supplied with electricity.

Further, in #2, the microcomputer MCB loads data from the lens circuit LE. Firstly, a terminal CSL thereof is turned to "H" so that an interface circuit IFC can serially input data from the lens circuit LE, and eight clock pulses for 1 byte are produced at a terminal CKOB. In this operation, since a terminal CSL of the interface circuit IFC is "H", the lens circuit LE is made active and parallel data in the ROM is transmitted to a parallel-to-serial converter PS under control of a control circuit CC according to clocks from a terminal CKOL corresponding to clocks from the terminal CKOB. The parallel data is converted to serial data by the parallel-to-serial converter PS so that the serial data is outputted to a terminal SLD, being inputted to a serial input terminal SINB of the microcomputer MCB, which stores this 1 byte of data in a predetermined area of built-in memory.

On the other hand, in the lens circuit LE, every time 1 byte of data is outputted, the control circuit CC updates the address of the ROM, and the data stored in the ROM is outputted successively. When data varied with the zooming of a zoom lens is read out, the ROM address is determined by putting together a code data outputted from a code board ZC and the address data of the control circuit CC. Further, when a distance data is read out, the ROM address is determined by putting a code data, which responds to the amount of movement of the focusing lens, outputted from the code board ZD and the address data of the control circuit CC. A data from the ROM includes a distance data. In the case that a zoom lens is used, data sent to the camera body side includes an open aperture value, a maximum aperture value responding to the smallest aperture, a varying amount of the diaphragm in zooming, a data of the focal length f of the lens, a distance data, and a check data for detecting whether a lens is mounted or not.

After reading out data from the lens circuit LE, the microcomputer MCB starts in #3 reading out a data from the flash circuit FL. The terminal CSL is turned to "L", the terminal CSF is turned to "H", and the "H" pulse of duration TMO is produced at the terminal FMO. This pulse is fed to the flash control circuit IC shown in FIG. 4 through the terminal ST3 from the interface circuit IFC. When the signal (ST3) is inputted, the flash control circuit IC becomes able to output data to produce a pulse of "H" from the terminal INT, and thereby the flash microcomputer FLMC is actuated if said microcomputer FLMC is of inactivity. And the terminal W is turned to "H".

Further, the microcomputer MCB of the camera causes the terminal FCH to be "H" so that the interface circuit IFC may perform a serial input operation. When clock pulses are transferred to the flash control circuit IC through the terminal ST3, the flash control circuit IC produces clock pulses at the terminal SCK. As later described, synchronizing with the clock pulses, the flash microcomputer FLMC outputs data from its terminal SO and the data is outputted to the terminal ST2. The serial data are loaded to the microcomputer MCB from the serial input terminal SINB through the interface circuit IFC. They include, for example, data showing the state of ON-OFF of the main switch SW1 for enabling the flash circuit FL to operate, data showing whether the charging operation is completed or not, data concerning FDC (which is described later), data concerning a guide number, data showing whether the flash device is clipped on or not, and the like.

When initial data from the flash circuit FL are completely loaded, the program goes to #4, and in steps following #4 preparations for the photographing operation are performed. Firstly, the terminals CSF and FCH are turned to "L", the operation of the A/D converter incorporated in the light metering circuit LMC being started (#4). Secondly, the data including a exposure control mode, an exposure time, a diaphragm value, ISO sensitivity, and the like are inputted to the microcomputer MCB (#5) and the A/D converted data from the light metering circuit LMC is inputted thereto (#6).

Now, the light metering circuit LMC is provided a light metering means for metering ambient light, an A/D converter for converting the metered ambient light signals to digital signals, and a flashlight metering means for metering the flashlight. The flashlight metering means starts to integrate a light metering value when the terminal FSA is turned to "L", and generates an "H" pulse for stopping the illumination of the flashlight from the terminal FSP when the integrated value of the flashlight metering means reaches to the value corresponding to the ISO sensitivity.

After loading the A/D converted data in abovementioned #6, it is judged whether a flashlight device is mounted (ON state) or not in #7. If the answer is "the state of ON", the calculation for flash light photography is performed in #8, and if the answer is not "the state of ON", the computing of the ambient light photography is performed in #9. Next, in #10 the computed control value, modes, and the like are displayed on a display DSP, and in #11, it is judged whether an interchangeable lens is mounted or not on the basis of the check data. If the interchangeable lens is mounted, the focal length f is updated and if not mounted, the focal length is not updated. And after the belowmentioned steps, data is transferred to the flash circuit FL.

In #12-1, lens data, a luminance data, and flash data are transferred to an auto focusing microcomputer AFMC. In #12-2, it is judged whether auto focusing (hereinafter referred to as AF) processing is finished or not by the signal AFEND fed from the AF microcomputer. And, if AF processing is finished, the data from AF microcomputer is inputted to the microcomputer MCB in #12-3.

Now, the operation of the AF microcomputer AFMC will be described with reference to the flow chart in FIG. 3.

In #31 the AF microcomputer AFMC inputs data including lens data, a light metering data, and flash data from the microcomputer MCB. In #32 the integration of CCD is begun and in #33 the integrated data are dumped. In #34 the dumped data are computed to get the defocus amount. Then, it is judged in #36 whether or not it is able to get the defocus amount. If it is able to get the defocus amount, the program advances to #41 in which it is judged whether or not the lens is in focus. If the lens has not yet been in focus, the program goes to #42 in which a motor is rotatively driven, and the operation of #32 to #35, #41, and #42 is carried out until the lens is in focus. When the in-focus condition is obtained, the program goes from #42 to #43 where a distance validity data is set to show that the distance data is valid, and the program advances to #45.

If, in #35, the contrast of an object is too low to get defocus amount, the program goes to #36. In #36 it is judged whether the brightness of an object is low or not. If low, the program advances to #37 where it is judged whether an auxiliary light is turned on or off. If the auxiliary light is turned on, the program advances to #44 where the distance validity data is reset, moreover an auxiliary lighting data being reset in #45. After all, if the brightness of the object is low in spite of illuminating the auxiliary light, it is judged for the auxiliary light to fail to reach the object, then AF operation being stopped.

If, in #36, it is judged that the auxiliary light is turned off, the program goes to #38, where it is judged whether a flash device is mounted or not. If mounted, in #39 it is judged whether the auxiliary light is to be incident on the valid position or not, that is, whether or not the illuminating direction of the flash device is directed correctly towards the object. If correctly directed, the auxiliary lighting data is set in #40. When a flash device is not mounted, when it is connected to the camera by an off camera cable, or when a flashlight is not correctly directed to an object, the program advances to #44 and #45. In #46, the signal AFEND is outputted to inform the microcomputer MCB that the AF operation is finished. And in #47, the data including an information of focusing condition or low contrast, the auxiliary lighting data, and the distance validity data are fed to the microcomputer MCB.

Referring again to FIG. 2, an operation of transferring data in #13 will be described. The terminal CSF is turned to "H" and "H" pulses with the duration of TM1 are generated from a terminal FMO, and which are fed to the terminal ST3 through the interface circuit IFC. When the control circuit IC (FIG. 4) receives these pulses, it turns its terminal R to "H" and conditions the microcomputer FLMC to input data. And the circuit IC conditions itself to feed clocks from a terminal ST3 to the terminal SCK to output data from a terminal ST2 to a terminal SI. While the terminal CSF is "H" and the terminal FCB is "L", the microcomputer MCB of the camera body side serially outputs a control aperture value, an exposure control mode (P, A, S, or M mode), ISO sensitivity, a focal length, a distance data, a distance validity data, and an auxiliary lighting signal 1 byte by 1 byte. The interface circuit IFC outputs clocks to the terminal ST3 and outputs data to the terminal ST2, these data being loaded to the microcomputer FLMC of the flash circuit FL.

When the auxiliary lighting data is inputted, as described later, the flash microcomputer FLMC illuminates a LED for emitting the auxiliary light, the LED is built in the flash device. In #13-1 in FIG. 2, it is judged whether the auxiliary lighting data is set or not. If set, the program returns to #12-1 where the AF operation with an auxiliary light is performed, and if reset, the program goes to #14 where it is judged whether a light metering switch S1 is turned on or not. If it is turned on, the program advances to #19. In #19, judged is the state of the reset switch S3 which is close upon completing the exposure control operation and open upon completing the cocking of the exposure control mechanism. If the switch S3 is turned on, since the cocking is not completed, the program returns to #2 without judging the state of the release switch S2, and the operations mentioned above are performed.

On the other hand, if the reset switch S3 is turned off after completing the cocking, it is judged whether the release switch S2, which is closed by the second depression of the release button, is turned on or not (#20). If it is judged that this release switch S2 is not turned on, in #21 a timer for holding a power supply starts counting from an initial value and the program returns to #2.

On one hand, if the release switch S2 is judged to be turned on in said #20, exposure starting signal is in #22, fed to the flash circuit FL. In this operation, the terminal CSF is turned to "H" and an "H" level pulse with duration of TM2 is outputted from the terminal FMO. This pulse is, through the terminal ST3, fed to the control circuit IC, which turns the terminal REL to "H" to inform the flash microcomputer FLMC that condition is turned to a release condition, and to enable the microcomputer FLMC to genetate signals. Next, the microcomputer MCB turns the terminal CSF to "L" and the terminal RELB to "H" to make the exposure control circuit EXC control the exposure. At this time, since the terminal RELB is turned to "H", the interface circuit IFC feeds the signals, which are inputted through the terminal ST2 from the flash circuit, to the terminal FSA and the signals which are inputted from the terminal FSP, to the terminal ST3.

When the exposure starting signal is inputted, the flash microcomputer FLMC turns the terminal SO to "H", then the terminal ST2 being turned to "H" by means of the abovementioned operations of the control circuit IC. When a closing signal of X sync switch Sx (FIG. 1) is fed to the flash microcomputer FLMC through the terminal ST1, the terminal SO is turned to "L". Hereby, the terminal FSA is turned from "H" to "L". And then, the light metering circuit LMC starts an integral operation at the down edge of the signal from the terminal FSA.

On one hand, when the closing signal of the X sync switch Sx is inputted, the microcomputer FLMC turns the terminal XETRIG to "H" and makes a xenon tube illuminate as explained later. When the integrated value in the light metering circuit LMC reaches a predetermined value, the signal for stopping the illumination is outputted to the terminal FSP. And the signal is fed to the control circuit IC through the interface circuit IFC and the terminal ST3. The flash microcomputer FLMC turns the terminal XETRIG to "L" and at the same time turns the terminal STOPGATE to "H", then the signal for stopping the illumination is generated from the terminal XESTOP, thus the illumination of the flashlight being stopped as described later.

The exposure control operation as abovementioned is performed in #23 and thereafter, the program execution of the microcomputer MCB returns to #14. Here, it is also judged whether the light metering switch S1 is turned on or not. If turned on, the program returns to #2 through #19. On the other hand, if the switch S1 is turned off, since the switch S3 is on now, the microcomputer MBC turns off the transistor BTO in #17, causes the terminal $\overline{IT}$ to be enabled in #18, and the sequence of the operations is completed.

On one hand, in case the cocking of the exposure control mechanism is completed so that the reset switch S3 is turned off, when the light metering switch S1 is turned off, the program goes from #14 through #15 to #16, where it is judged whether the timer overflows (for example, 10 seconds have passed since the timer was started at #21) or not. If overflowed, the program goes to #17 and the microcomputer MCB finishes its operation. If not overflowed, the operations from #2 to #16 are repeated.

Next, the constitution and the operation of the flash circuit FL will be described with reference to FIGS. 4 to 23.

Transistors Q1, Q2, a thyristor Thr1 (silicon controlled rectifier elements), and resistors R1, R2, R3, R4, R5, and R6 constitute a DC/DC converter which boosts the electric voltage of a battery BATT to produce a high voltage and a control voltage of the transistor Q5 for controlling the illumination as described later. By turning a terminal OSCST to "L", the transistor Q2 is turned on, thereby the thyristor Thr1 being turned on, and a high voltage and a control voltage are produced from the secondary of a transformer T1 by blocking oscillation with the transistor Q1 and the transformer T1. A diode D2, a transistor Q4, a zener diode ZD1, a resistor R9, and capacitors C2 and C3 constitute a rectifying circuit and a constant voltage circuit which makes a control voltage of the transistor Q5 stabilized. A circuit consisting of a capacitor C4, resistances R10 and R11 is a circuit for measuring a high voltage. The high voltage is divided by the resistors R10 and R11, the divided voltage is supplied to the terminal Hv of the microcomputer FLMC. The microcomputer FLMC converts the voltage supplied the terminal Hv into a digital value so as to detect the high voltage.

C5 and C6 designate main capacitors. A photo-thyristor PHThr is usually turned on because a terminal C2CHG is usually "L". Hereby, a voltage boosted by the DC/DC converter charges the capacitor C6 through a diode D4 and the capacitor C5 through a photo-thyristor PHThr respectively.

When a belowmentioned quick charge mode is selected, as the terminal C2CHG is "H" until the voltage of the capacitor C5 becomes a predetermined voltage value, the photo-thyristor PHThr is made off. Therefor, the capacitor C5 is previously charged and the terminal C2CHG is controlled so that the capacitor C6 may be charged after charging the capacitor C5 up to the predetermined voltage. A xenon tube XE, a diode D8, and a transistor Q5 constitute a illumination circuit in which by turning on the transistor Q5, turned on is a trigger circuit consisting of a capacitor 10, a transformer T2, and resistor R30, then a trigger voltage being applied to the xenon tube XE. At the same time, a double voltage booster consisting of a resistor 18, a capacitor C9, a resistor 19, and a diode D8, drops a cathode potential of the xenon tube XE to a reverse voltage $-V$ of a main capacitor voltage V, thus the double voltage of 2.V is applied between the terminals of the xenon tube XE, which is conditioned to be able to illuminate. Energy in capacitors C5 and C6 is discharged through the diodes D5, D6, an inductance L1, the xenon tube XE, the diode D8, and the transistor Q5.

The inductance L1 is for delaying the starting of the xenon tube XE radiation and a diode D7 is for absorbing a counter electromotive voltage of the inductance L1. The transistor Q5 is an element, e.g. an IGBT, which can stand a high voltage and large current. The transistor Q5 is turned on or off by turning its base voltage to "H" or "L" Transistors Q6, Q7, Q8 and Q9 and resistors R20 to R29 constitute a circuit for controlling the base voltage of the transistor Q5.

When a terminal XETRIG of the microcomputer FLMC turns to "H", the transistors Q7 and Q8 are turned on, the transistor Q5 being turned on. When a terminal XESTOP of the control circuit IC turns to "H", the transistor Q9 is turned on, thereby a base voltage of the transistor Q5 is dropped, then the transistor Q5 is turned off. Also the transistor Q6 is turned on, and the transistors Q7 and Q8 is turned off, thereby the power consumption is minimized.

LED1 designates a light emitting diode which is used as an auxiliary illumination for the auto focusing. When a terminal AFLED of the flash microcomputer FLMC turns to "H", the transistor Q3 is turned on and the LED is illuminated. LEDs LED2 to LED6 designate light emitting diodes for displaying the states or the modes of the flash device respectively. In other words, the LED2 displays the flash is to be emitted, LED3 displays the flash is not to be emitted, LED4 displays the maximum illuminating amount is restricted, LED 5 displays the main capacitor C5 or C6 are charged up to the predetermined voltage, and LED 6 displays that the flashlight is in a automatic illumination controlled by the camera.

Transistors Q10 to Q13 and resistors R30 to R37 constitute a circuit for driving a stepping motor PM (which may be called "a pulse motor" in this specification). When each of the transistors is turned on with the sequences from Q13 to Q12, Q11, Q10, the stepping motor PM is rotated. When turned on with the reverse sequences, it is reversely rotated (see waveforms in FIGS. 18(b) and 19(b) as described later).

Figures 23A, 23B:
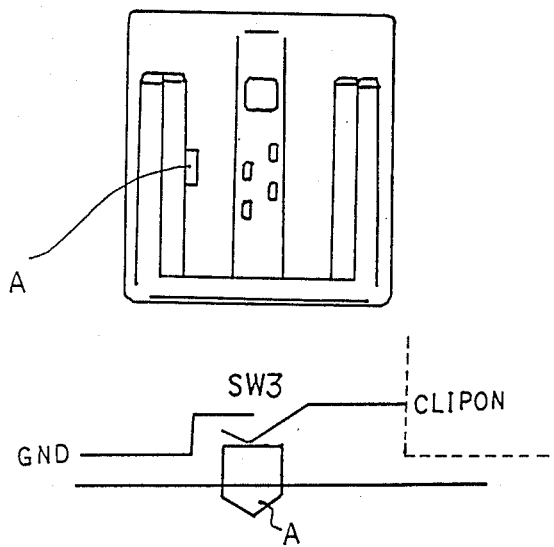
FIGS. 23(a) and 23(b) are an elevational view showing an example of a mounting portion of the flashlight and a view showing a functional constitution thereof.

SW1 designates a key switch (ON/OFF key) for selecting whether a flash is illuminated or not, SW2 a key switch (Hi/Lo) for setting the maximum illumination amount, and SW3 a clip-on detection switch (CLIPON) which is turned on only when the flash is correctly mounted on the camera. In case a off-camera cable is used, since there is a hole H at the point where a detective pin of the camera shoe is touched as shown in FIG. 22, the clip-on detection switch SW3 is not turned on even when a clip-on type of a flash device is mounted on the camera as shown in FIG. 23. In other words, when the flash device is mounted on the shoe of the camera, a projection A of the mounting portion of the flash device is pressed up to turn on the switch SW3 by a plane of the shoe of the camera, then the clip-on is detected. Whereas when a flash device is mounted on the off-camera shoe shown in FIG. 22, the projection A is inserted in the hole H without turning on the switch SW3, then the clip-on is not detected. The camera shoe and the off-camera shoe differ only in whether there is the hole H or not.

The detecting signal of the switch S3 is fed to the camera and loaded to the AF microcomputer. And, as described above, in case the clip-on is not detected signal for emitting an auxiliary illumination is not produced. When an illuminating angle is set to the widest angle, a switch SW4 is turned on, and the illuminating angle is controlled by the step number of the stepping motor PM as the starting point wherefrom the switch SW4 is turned on. Capacitors C7 and C8 and an oscillating element CF constitute a circuit for generating standard clocks, which are fed to the flash microcomputer FLMC and the control circuit IC.

Figure 4:
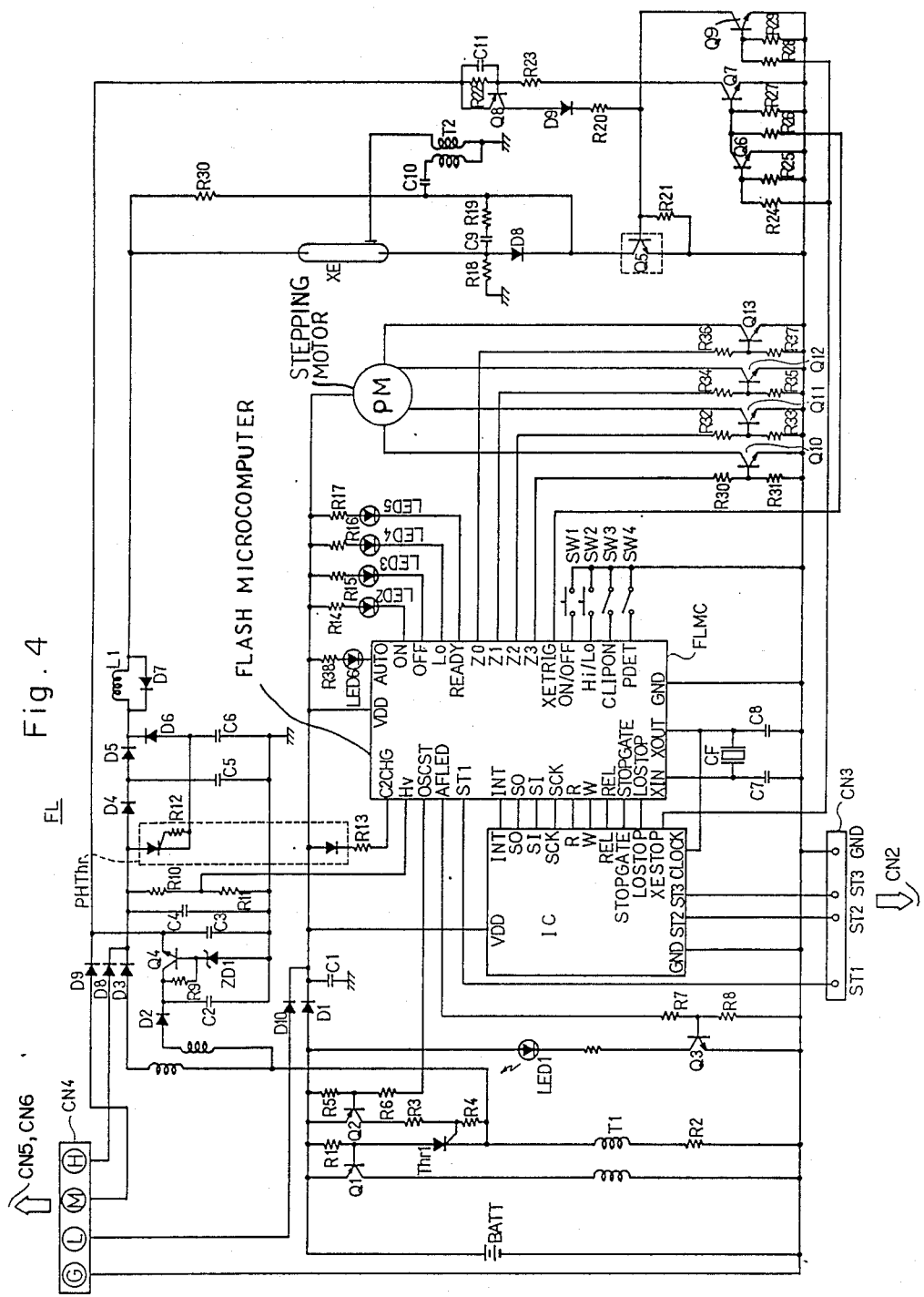
FIG. 4 is a circuit diagram of a flash circuit.
Figure 20:
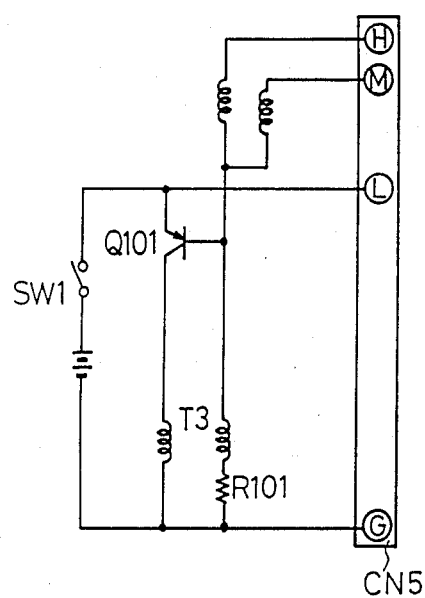
FIGS. 20 and 21 designates a constitution of an external electric source connected to the flash circuit respectively.
Figure 21:
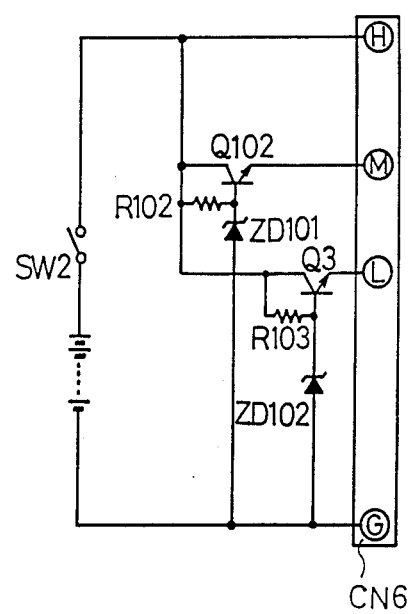
Figure 22A:
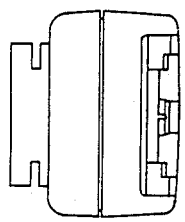
FIGS. 22(a) to (e) are a left side view, a top view, right side view, an elevational view, and a bottom view of an off camera shoe in using an off camera cable, respectively.
Figure 22B:
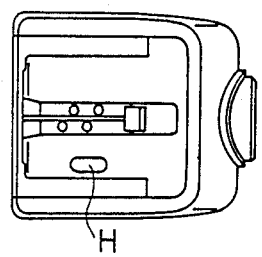
Figure 22C:
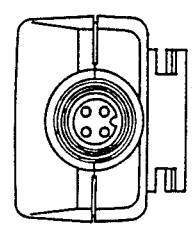
Figure 22D:
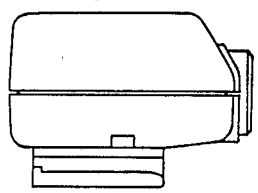
Figure 22E:
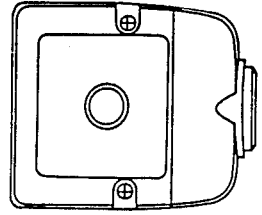

FIGS. 20 and 21 show a constitution of an embodiment of an external electric source connected to the flash circuit as shown in FIG. 4 respectively and connectors CN5 and CN6 are connected to a connector CN4.

In FIG. 20, when a switch SW1 is turned on, a blocking oscillation circuit consisting of a transistor Q101, a transformer T3, and a resistor R101 starts to operate, it produces a voltage on terminals H and M respectively.

Now, when a battery BATT is exhausted, if the abovementioned external electric source is mounted and only the output of the terminal H is inputted to the flash circuit FL, there is possibility that the voltage applied to the base of the transistor Q5 becomes low so as not to control the transistor Q5. Therefor, both outputs of the high voltage terminal H and the terminal M of the external electric source are inputted as an electric source of the transistor Q5.

FIG. 21 shows the case of using a high voltage battery as an external electric source and which produces a constant voltage at a terminal M by a transistor Q102, a resistor R102, and a zener diode ZD101. Similarly, an electric source for controlling circuits is inputted from a terminal L by a transistor Q103, a resistor R103, and a zener diode ZD102.

Figure 5:
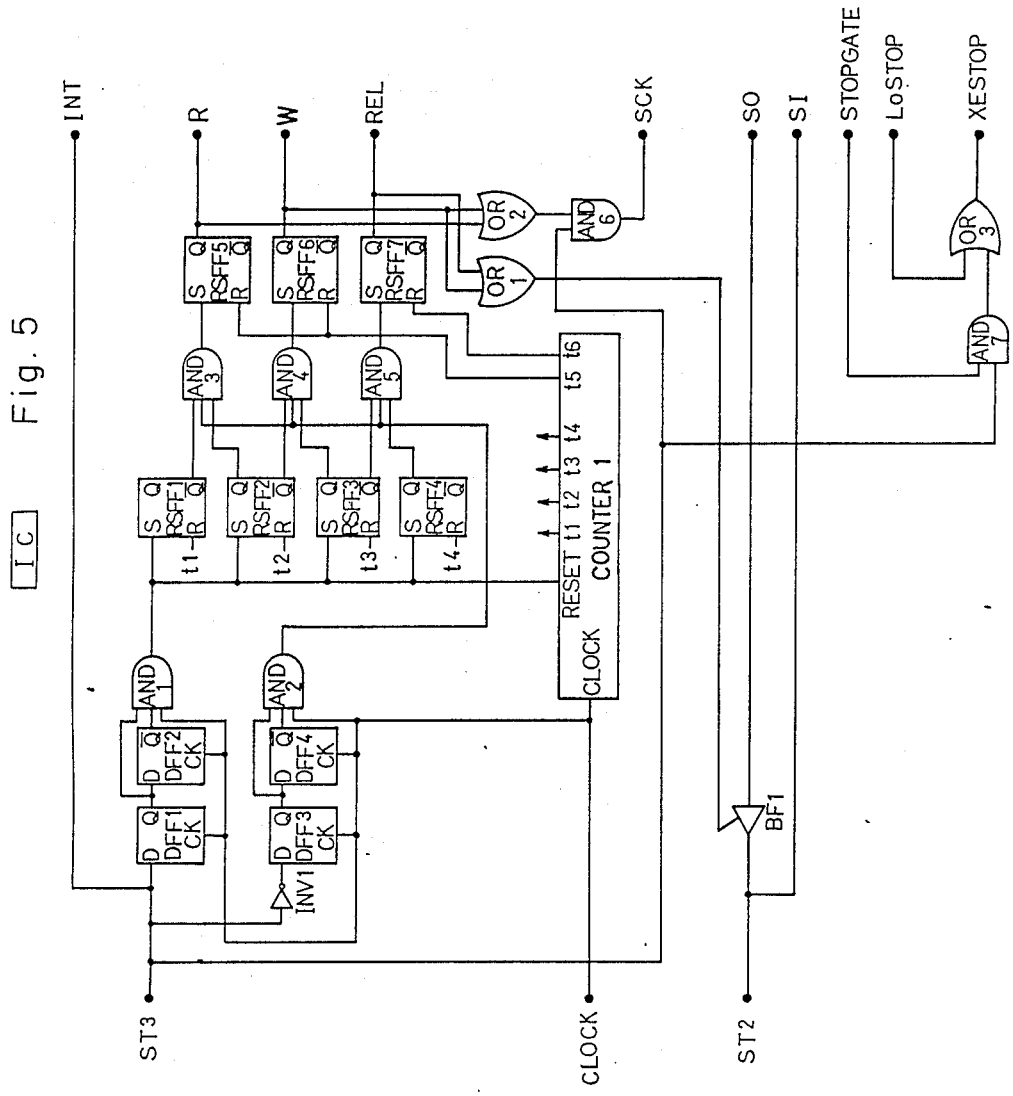
FIG. 5 is a constitution diagram of a controlling circuit IC of a flashlight.
Figure 6:
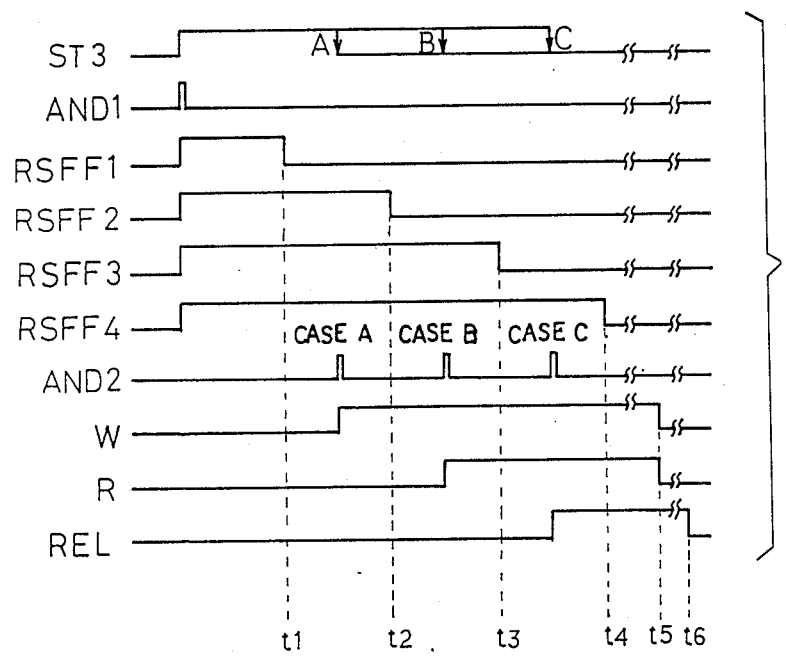
FIG. 6 is a time chart of an operation of the controlling circuit IC.

FIG. 5 shows a constitution of an embodiment of the flash control circuit IC and FIG. 6 shows waveforms of its operation. As described above, when signals are transferred from the camera to the flash device, when from the flash device to the camera, or when the camera is released, a pulse with the different duration according to the situation, respectively is produced from the terminal ST3. This controlling circuit IC judges the duration of the pulse and informs the microcomputer FLMC how state of signals is and at the same time generates clocks for serial transfer to the microcomputer FLMC. Further, it functions as feeding the data outputted from the microcomputer FLMC to the terminal ST2. Furthermore, it functions as feeding the flash stop signal, which is outputted from the camera to the terminal ST3, into the flash stop circuit.

D-type flip-flops (hereinafter referred to as DFF) DFF1 and DFF2, and a AND circuit (hereinafter referred to as AND) AND1 constitute a detecting circuit for detecting the leading edge of the terminal ST3 turning from "L" to "H" and in which a pulse with duration of the standard clock is outputted from the AND1 when the terminal ST3 turning from "L" to "H". An inverter (hereinafter referred to as INV) INV1, DFF3, DFF4, and AND2 constitute a detecting circuit for detecting the down edge turning from "H" to "L" at the terminal ST3 and in which a pulse with duration of the standard clock is outputted from the AND2 when the terminal ST3 turning from "H" to "L" thereof.

Now, when the terminal ST3 is turned from "L" to "H", the pulse is produced from the AND1. By this pulse, R-S flip-flops (hereinafter referred to as RSFF) RSFF1 to RSFF4 are set and a counter 1 is reset. Terminals t1 to t6 of the counter 1 are turned to "H" when the counter 1 counts time t1 to t6, respectively. Accordingly, RSFFs 1 to 4 are respectively reset on timing from t1 to t4. AND3 is connected with the inverted output $\bar{Q}$ of RSFF1 and the non-inverted output Q of RSFF2, and is conditioned to accept output signals of AND2 between t1 and t2. If the duration of the pulse inputted to the terminal ST3 is between t1 and t2, a pulse is outputted from AND3, thereby RSFF5 is set. Similarly, if between t2 and t3, RSFF6 is set, and if between t3 and t4, RSFF7 is set. Consequently, the pulse duration outputted from the camera to the terminal ST3 is defined between t1 and t2 in case of transferring signals from the camera to the flash, and is defined between t2 and t3 in case of transferring signals from the flash to the camera, and is defined between t3 and t4 in case of the transferring release signal.

Clock pulses for serial communication which are inputted to the terminal ST3, after the discriminating pulse are outputted from the terminal SCK through AND6. One of the inputs of AND6 is connected to the output of an OR circuit (hereinafter referred to as OR) OR2, which is connected to the outputs of RSFF5 and RSFF6. When the data transmission is carried out between the camera and the flash, OR2 outputs "H", therefore, the clock pulses from the terminal ST3 are to be outputted from the terminal SCK only under theses situations. At the lead edge of the every clock pulse, AND1 produces a pulse and the counter 1 is reset. The time t5 after a last pulse of the clock pulses rises, RSFF5 and RSFF6 are reset. RSFF7 is reset a time t6 after the release signal is inputted to the terminal ST3. The time t6 is defined as a period from the time when the release signal is generated to the time when the exposure control operation with flash is completed, during which period the X-sync switch Sx is turned on.

When the release signal is inputted to the terminal ST3 or when signals are transferred from the flash to the camera, the output of OR1 is turned to "H" and a bus buffer BF1 becomes enabled to output signals being produced from the serial output terminal SO of the microcomputer FLCM. Further, signals inputted to the terminal ST2 are outputted from the terminal SI, which is connected to the serial inputting terminal SI of the microcomputer FLMC. One input terminal of the AND7 is connected the terminal ST3 and the other terminal is connected to the terminal STOPGATE. The flash microcomputer FLMC outputs an emitting signal (turning the terminal XETRIG to "H"), at the same time turns the terminal STOPGATE to "H" so as to be able to accept the flash stop signal, which is fed to the terminal XESTOP through OR3.

The other terminal of OR3 is connected to the terminal LoSTOP of the microcomputer FLMC. When the illumination amount is limited (the Lo of the Hi/Lo key is selected), the microcomputer FLMC turns the terminal LoSTOP to "H" a predetermined time after the flash light is emitted. Hereby, the terminal XESTOP is turned to "H" and the illumination of the flash stops.

FIGS. 7 to 16 are flow charts of the microcomputer FLMC to be used for a flash device according to the present invention. Now, the operation of the flash device will be described with reference to the flow charts.

Figure 7:
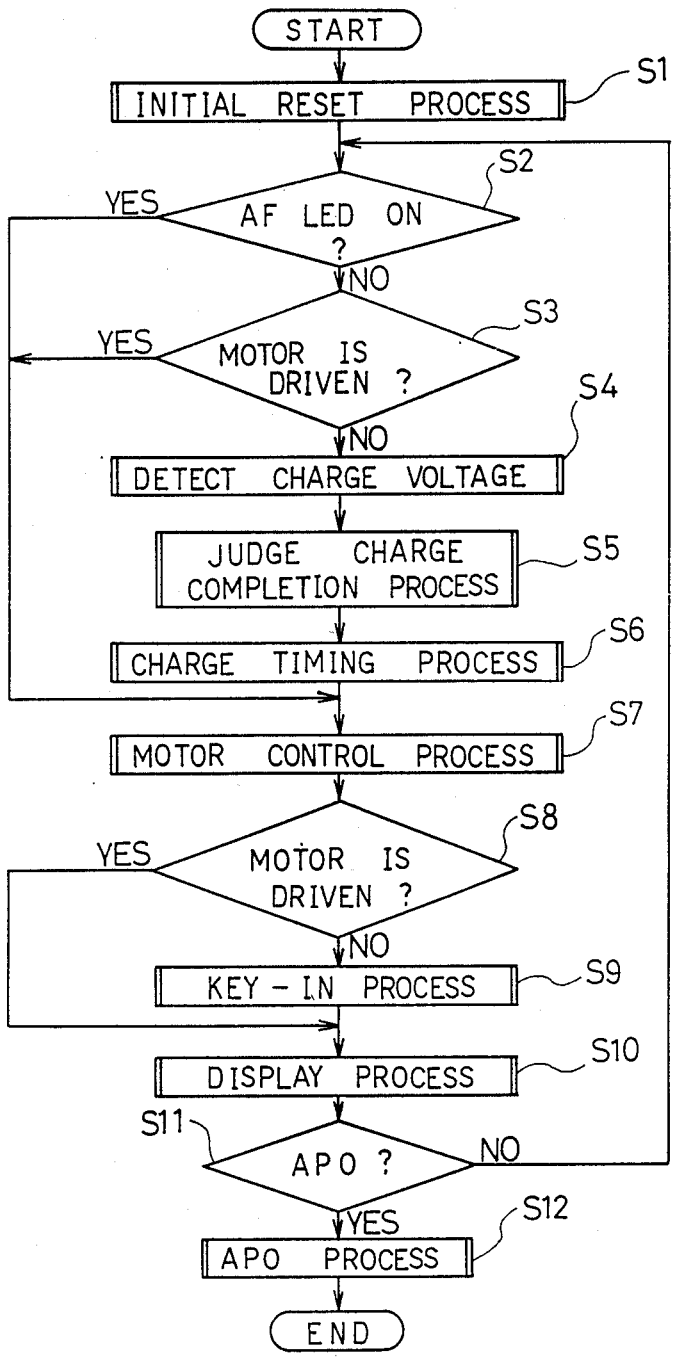
FIGS. 7 to 11 are a flow chart showing an operation of a microcomputer used for the flashlight.

FIG. 7 schematically shows the operation of the flash microcomputer FLMC. In step S1, performed is "the initial reset process" involving the initialization of various types of flags used in the programs and the reset of an illuminating angle as described later. In next step S2, it is judged whether the LED1 is illuminating or not which is built in the flash and used as an auxiliary illumination for AF. If the LED1 is not turned on, the program advances to step S3 and if turned on, advances to the step S7 skipping the steps S3 to S6 because the charge for the flashlight has stopped. In step S3, it is judged whether the stepping motor PM is driven or not. If not driven, the program goes to step S4 and if driven, goes to step S7 because the charge for the flashlight has also stopped.

In step S4 the voltages of the main capacitors C5 and C6 is detected respectively, and in step S5 it is judged whether the charge thereof is completed or not, and thereby a charge completion lamp LED5 is controlled to turn or off. In step S6 the timing of the charge is controlled, that is, the charge is stopped on the main capacitors C5 and C6 being fully charged and is started on operating the camera or the flash device.

In step S7, the pulse motor PM for controlling the illuminating angle is controlled, that is, the illuminating angle is set according to the focal length of the lens mounted on the camera as described later, and moreover, FLMC controls the motor PM on the basis of the distance information transferred from the camera to improve the uneven illumination caused by the discrepancy between an optical axis of the lens and that of the flash in case of the short range photography in which the photographing distance is relatively short (hereinafter referred to as a short range compensation mode).

In step S8, it is judged whether the motor PM is driven or not. If driven, the program goes to step S10 skipping the step S9. In step 9, is performed the key input processes including a ON/OFF key for selecting illumination or unillumination and a Hi/Lo key for setting the maximum illumination amount. In step S10, the displays (LED2, LED3, and LED4) are controlled.

In step S11, it is judged whether the belowmentioned auto power off (APO) process is performed or not. That is, it is judged whether it has passed more than a predetermined time or not since the operation of the camera and the flash was over. If it has passed more than the predetermined time, the program advances to the APO process (step S2), to the contrary, if it has nor yet passed the predetermined time, the program returns to step S2, the abovementioned steps being repeated. In step S12, an illuminating angle is once reset to the widest angle and the microcomputer is set to the mode (hereinafter referred to as a stop mode) in which a current consumption is few. In this mode, when the terminal INT of the microcomputer FLMC is turned to "H" by the operation of the switches of the flash device or by the "H" pulse fed from the camera to the terminal ST3, the microcomputer FLMC starts to execute again from the step S1.

Figure 8:
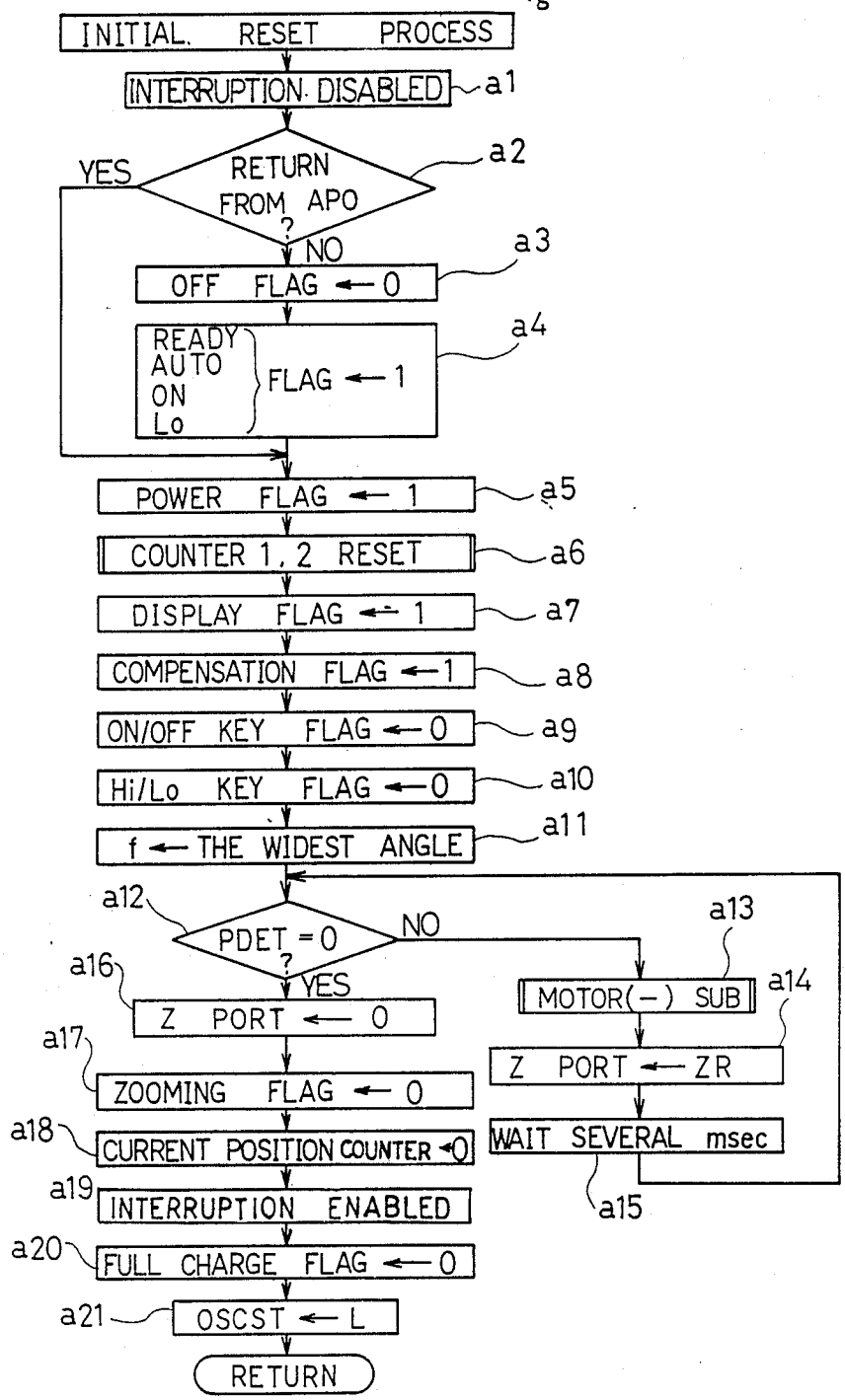

FIG. 8 shows a routine of the initial reset process.

In step a1, the interruption is disabled, and in step a2, it is judged whether the microcomputer FLMC starts its operation from the STOP mode or from the power supply reset. If starting from the power supply reset, various types of flags are initialized in the next steps a3 and a4. An OFF reset flag in step a3 is a flag for indicating an OFF state, and the OFF state is set when the flag is set to "0". In step a4, a charge completion flag (READY), an auto illumination flag (AUTO), an illumination flag (ON), and an illumination amount limit flag (Lo) are set to "1". As described below, the indications are turned on when the respective flags are set to "0".

In step a5, a POWER flag is set. This flag is automatically reset a predetermined time (T3) after the data communication is finished (as described later in FIG. 17). By checking this flag, it is judged whether the program goes to the step S11 (APO mode) or not. In step a6, the counters 1 and 2 are reset. These counters are automatically counted up independently of common routines.

Figure 17:
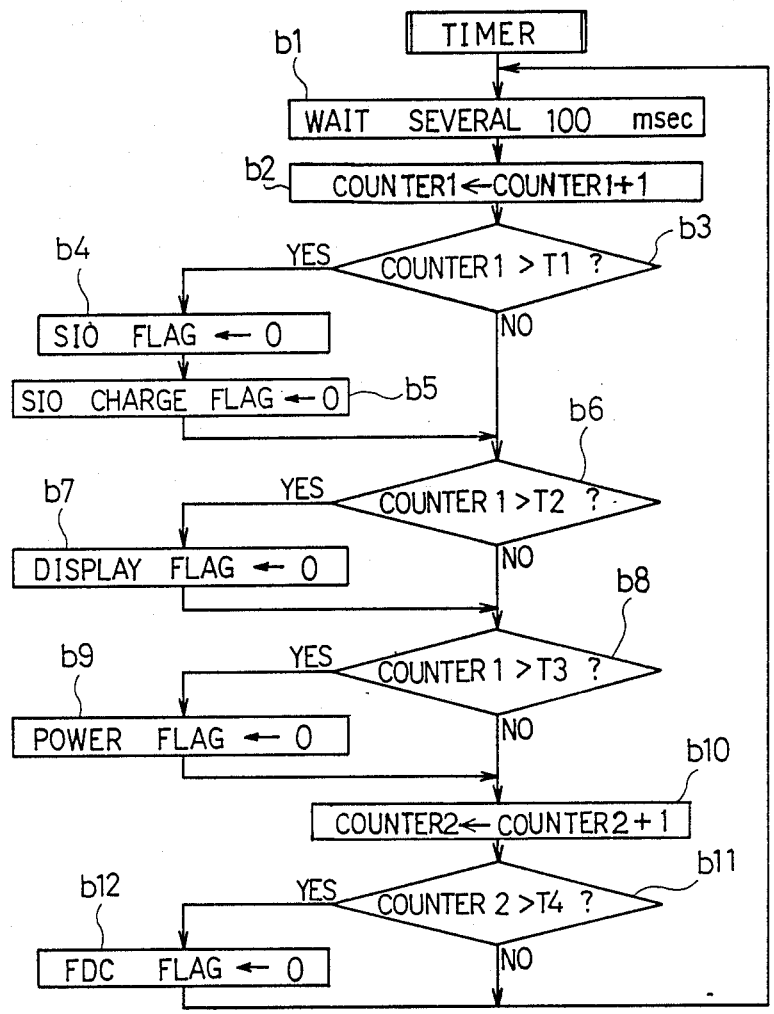
FIG. 17 is a flow chart showing an operation of a counter in the flashlight.
Figure 19:
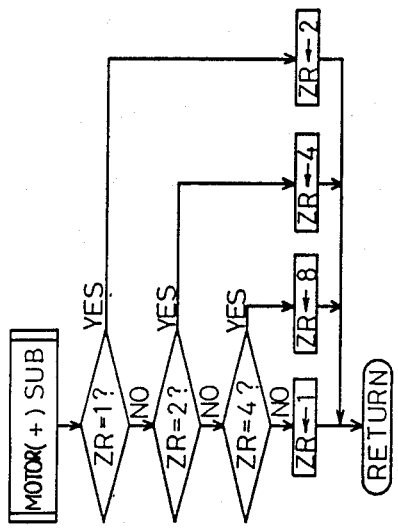
FIGS. 18(a), 18(b) and FIGS. 19(a), 19(b) are a flow chart of a subroutine and a output time chart in setting the port Z in order to drive a motor in the flashlight.
Figure 19:
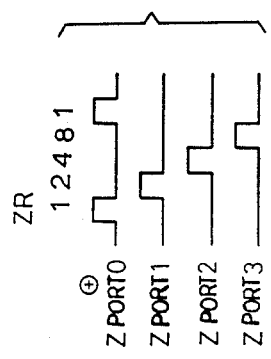
Figure 18:
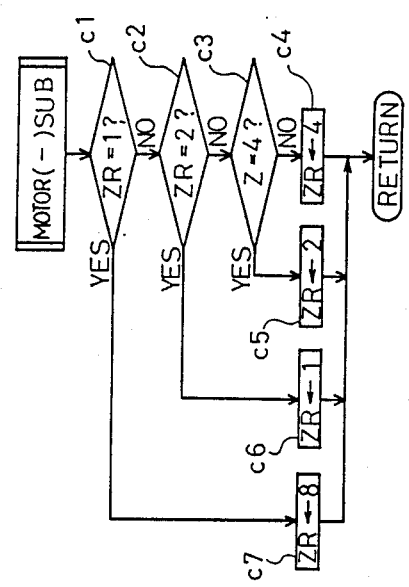
Figure 18:
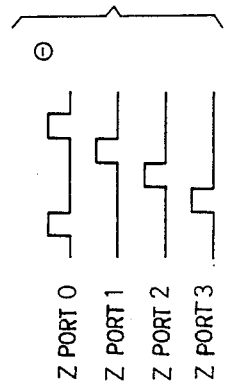

Here, the operation of these counters 1 and 2 will be described with reference to a flow chart in FIG. 17.

In steps b1 and b2, the counter 1 is counted up on a settled cycle. In step b3, compared a value of the counter 1 with a defined time T1, if the value of the counter 1 is less than the time T1, the program goes to step b6 and if more than the time T1, the program goes to step b4 where the SIO flag is reset. This flag is designed to turn to "1" upon communication with the camera. The counter 1 is reset upon every communication with the camera. Therefore, the abovementioned SIO flag is designed to be reset when not communicating with the camera during the time T1. In step b5, the SIO charge flag is reset and the program goes to step b6. As described below, the SIO charge flag is firstly turned to "1" on communicating with the camera and is reset when not communicating with the camera during the time T1.

In step b6, the value of the counter 1 is compared with a defined time T2. If the value is less than the time T2, the program advances to step b8 and if more than the time T2, the program advances to step b7 where the display flag is reset. This flag is set upon depressing a flash key and the flash display becomes enabling during the flag being set. In step b8, compared the value of the counter 1 with the time T3, if the value is less than the time T3, the program advances to b10, and if it becomes more than the time T3, the program goes to step b10 through step b9 where the POWER flag is reset. In step b10, the counter 2 is counted up and in step b11, the value of the counter 2 is compared with the set time T4. If the value is less than the time T4, the program returns to step b1 and if it becomes more than the time T4, the FDC flag is reset in b12. This flag is set upon completing a proper exposure by the flashlight as described later and at this time the counter 2 is reset, thereby the signal for informing the completion of a proper exposure is outputted to the camera during a predetermined time (T4) after the completion of the proper exposure.

Referring again to FIG. 8, in step a7, the display flag is set, then the display becoming enabling. In step a8, the compensation flag is set. As described later, this flag is set when a function is active for compensating the uneven illumination caused by the discrepancy between the optical axis of the camera and that of the flash, by making the illuminating angle of the flashlight set to the widest angle when a photographic distance is less than the predetermined value. The photographic distance where the compensation mode is reset is set larger than the distance where the compensation mode is set. That is, the changeover of the compensation mode has hysteresis. As that flag is reset in a8, the compensation is carried out when the flash device is initialized.

In step a9, reset is the flag for indicating the setting of the ON/OFF key (SW1). And in step a10, reset is the flag for indicating the setting of the Hi/Lo key (SW2). These flags are reset upon depressing the corresponding keys, and the key-in of the ON/OFF key and the Hi/Lo key is forbidden when these flags are set.

In steps a11, a12, a13, a14, and a15, the illuminating angle is reset. In step a11, the illuminating angle (SW2) f is set to the widest angle, thereafter it is judged whether the switch SW4 on the panel is turned on or not in step a12. If not turned on, in step 13 data ZR for driving the motor is set and in step a14 the data ZR for driving the motor is outputted from the port Z. Thereafter, in step a15, the program waits for a predetermined time, then the program returns to step a12. Hereby the motor is driven until the switch SW4 on the panel is turned on, that is, the illuminating angle is set to the widest angle.

FIGS. 18(a), 18(b), 19(a), and 19(b) are respectively flow charts showing subroutines for driving the motor and a time charts of the outputs of the port Z. In step c1, it is judged whether data was outputted at the last time is "1" or not. That is, if "H" was outputted from the Z port 0 at the last time, a register ZR is set to 8 in step c7, thereby the Z port 3 can output "H". Similarly, if, in step c2, "H" was outputted from the Z port 1 at the last time, the Z port 0 is turned to "H" and the Z port 1 to "L" in step c6. In step c3, if "H" was outputted from the Z port 2 at the last time, the Z port 1 is turned to "H" and the Z port 2 to "L" in step c5. If "H" was outputted from the Z port 3 at the last time, the Z port 2 is turned to "H" and the Z port 3 to "L". Then the program returns (see FIGS. 18(a) and 18(b)). When the motor PM is rotated to the opposite direction, the register ZR is set in the contrary order (see FIGS. 19(a) and 19(b)).

Referring again to FIG. 8, in step a12, if the panel switch SW4 is turned on, "0" is outputted from the Z port in step a16, then the motor PM being stopped. In step a17, reset is the zoom flag indicating that the illuminating angle is being changed and in step a18 the current position counter indicating the position of the reflector is set "0". In step a19, the interruption by the signal from the camera is enabled. In step a20 reset is the flag which is set upon the completion of the charge, the terminal OSCST is turned to "L" in step a21, the oscillation is started (the charging operation is started), and the program returns.

Figure 9:
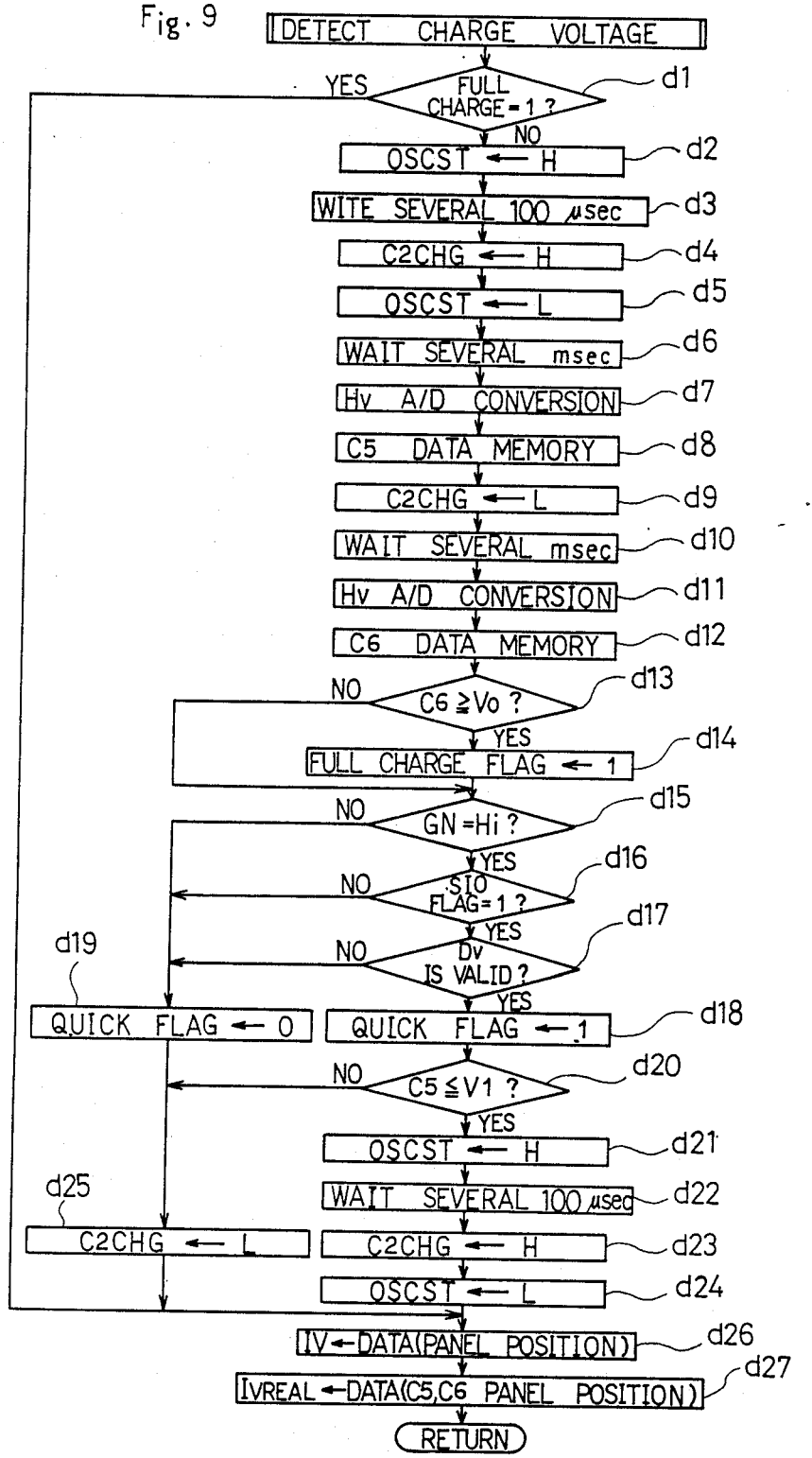

FIG. 9 designate a routine for detecting a charge voltage.

In step d1, a flag indicating full charge is checked. If not fully charged (the flag is reset), the terminal OSCST is turned to "H" in step d3 to stop the oscillation. And the terminal C2CHG is turned to "H" a predetermined time after in step d4, then in step d5, the oscillation is again started. Here, it is for the purpose of making a photo-thyristor turned perfectly off that the oscillation is stopped during a predetermined time. In step d7 a voltage is checked by the terminal Hv after waiting in step d6 the time for charging the capacitor C3, then the checked data being stored as the voltage level of the capacitor C5 in step d8. In step d9, the terminal C2CHG is turned to "L", and in step d10 the program waits for the time required for charging up the capacitor C3, thereafter the voltage of the terminal Hv being checked in step d11, and the checked data is stored as a voltage level of the capacitor C6 in step d12. Further, the voltage of the capacitor C6 is checked in step d13. If it reaches the level of the full charge (the full charge voltage of the capacitor c6 is represented by Vo, for example, 330 V), the flag indicating the full charge is set in step d14. In step d15, the illumination mode GN is checked. If the mode is set Hi, in next step d16, the SIO flag is checked. If communicating with the camera (the SIO flag being set), in step d17 it is checked whether the distance data Dv is valid or not. As described above, if the lens is in focus, the data Dv becomes valid, the program advancing to step d18.

In step d18, set is the quick flag indicating the quick charge mode. In step d19, the quick flag is reset when the illumination amount is set Lo or the SIO flag is 0 or the data Dv not valid. In step d20, it is checked whether or not the voltage of the capacitor C5 reaches the full charge voltage (the full charge voltage of the capacitor C5 is represented by V1, for example, 330 V). If reaching, in step d25 the terminal C2CHG is turned to "L" to start the charge of the capacitor C6. If the voltage of the capacitor C5 is less than the voltage level V1 of the full charge, in steps d21, d22, and d23 the photo-thyristor is turned off to forbid the charge of the capacitor C6 and the oscillation again starts in step d24. Hereby, in the quick charge mode, the capacitor C5 is firstly charged and when the voltage of the capacitor C5 reaches the full charge voltage V1, the charging of the capacitor C6 starts, the oscillation being stopped when the voltage of C6 reaches the level V0 of the full charge.

In step d26, Iv is set the illumination data according to the panel position. In step d27, $I_{VREAL}$ is set the data according to the voltage of the capacitors C5, C6 and the panel position. Iv indicates the official illuminating amount and $I_{VREAL}$ indicates the illumination amount obtained upon illuminating at the current voltage of the capacitors C5 and C6.

Figure 10:
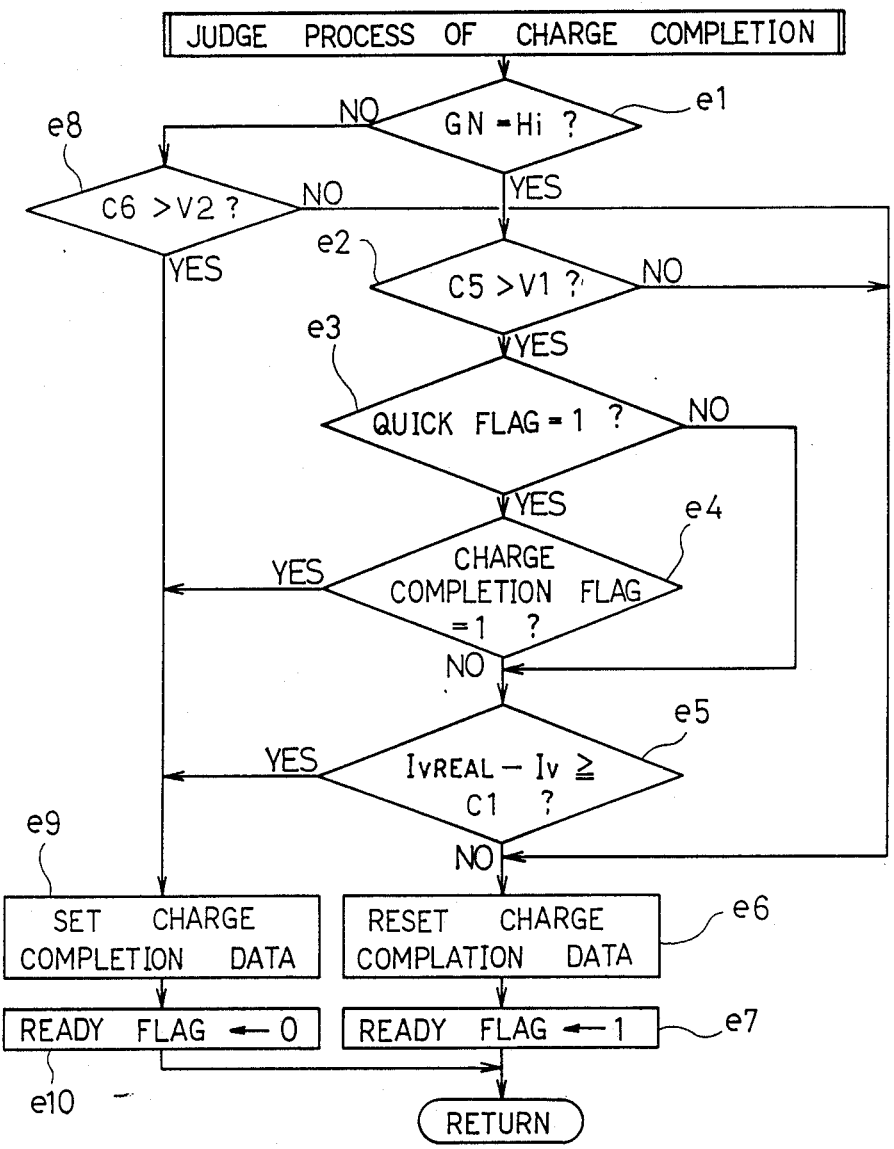

FIG. 10 shows a routine for judging the completion of the charge.

In step e1, the illumination amount mode GN is checked. If it is set Hi, the voltage of the capacitor C5 is checked in step e2. If the voltage of the capacitor C5 is more than level V2 capable of illuminating, the program goes to next step e3. If less than V2, the program goes to step e6. In step e3, it is judged whether the quick charge mode is set or not. If set, the program advances to step e4, and if not set, to step e5. In step e4, the state of the charge completion flag is judged. Compared the illumination amount $I_{VNeed}$ required by the camera ($I_{VNeed}$ is computed at step e13 in FIG. 16(a) on the photographing distance, the film sensitivity, and the aperture value which are inputted from the camera) with the abovementioned $I_{VREAL}$, when $I_{VNeed} < I_{VREAL}$, the charge completion flag is set. If this flag is set in e9, the dada indicating the charge completion to be transferred to the camera is set. In step e10, the READY flag is turned to "0", thereby the illumination of the LED5 being prepared. In step e5, compared the abovementioned Iv with the $I_{VREAL}$, if the difference between them is more than or equal to C1 (conventional voltage level of a complete charge, for example, −0.8 EV), the program advances to steps e9 and e10. That is, when the illumination amount by the capacitors C5 and C6 becomes more than a predetermined ratio of the official illumination amount, the charging operation turns to the charge completion state.

On one hand, in step e1, if the illumination amount is Lo, it is judged whether the voltage of the capacitor C6 is greater than the abovementioned voltage level V1 or not in step e8. At this time, as described above, the capacitors C5 and C6 have the same voltage level. If the capacitor C6 has the voltage capable of illuminating flash light, the program advances to steps e9 and e10. If the capacitor C6 has the voltage less than the voltage capable of illuminating flash light, the charge completion flag is reset in step e6, the extinguishment of LED5 which indicates READY being prepared.

Here, the operation in the quick charge mode as described above, will be resumed as follows: the operation in this mode is carried out under the conditions that the illumination amount is set Hi, that the microcomputer FLMC is communicating with the camera, and that the distance data is valid. In this mode, the capacitor C5 is firstly charged, thereafter the capacitor C6 being charged. Further, on the data from the camera, a required illumination amount is computed and if this amount is less than the illumination amount which is produced by the capacitors C5 and C6, charge completion is displayed. The reason why divided two capacitors are used is that it is possible for the flash light to be emitted as soon as possible by firstly charging one capacitor C5.

Figure 11:
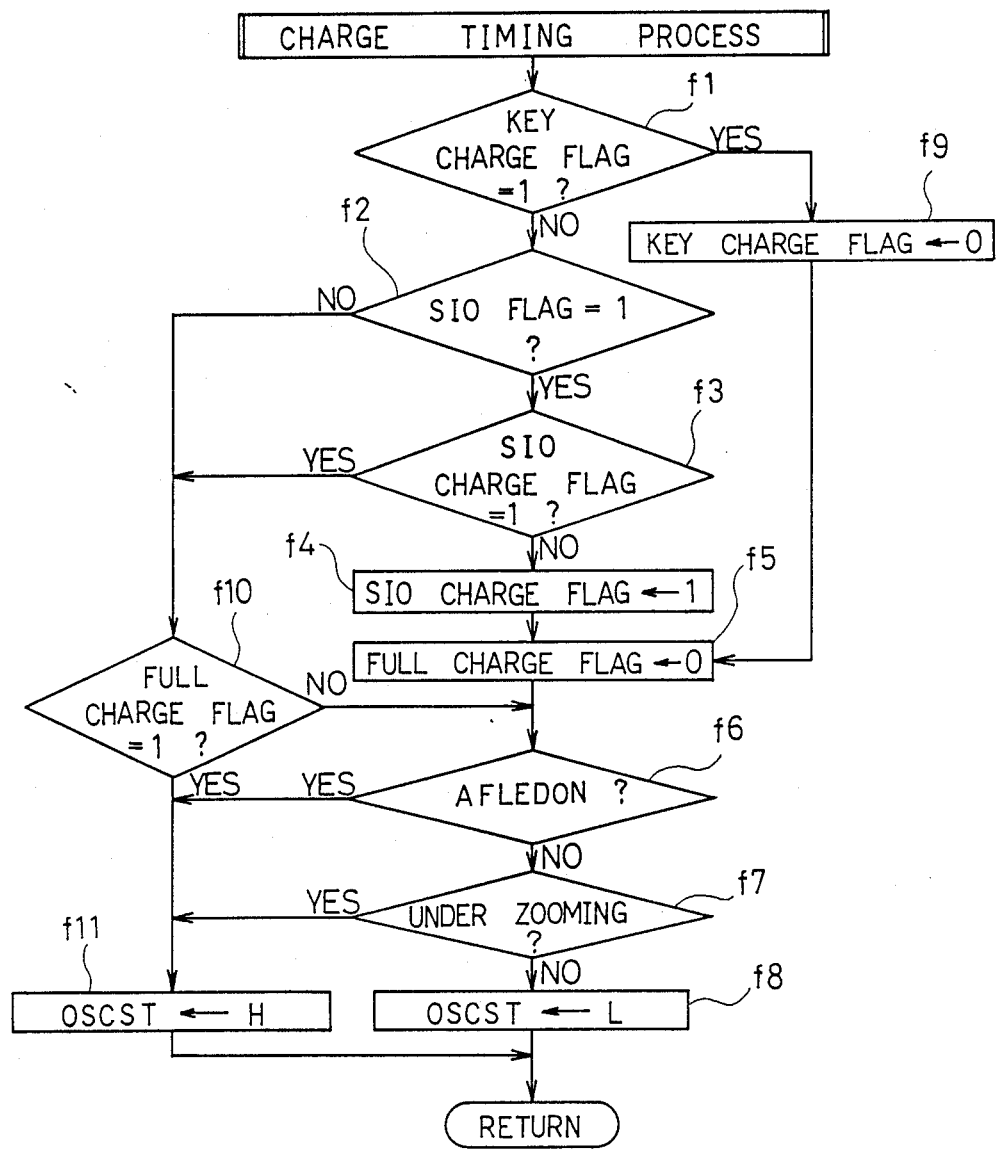
Figure 12:
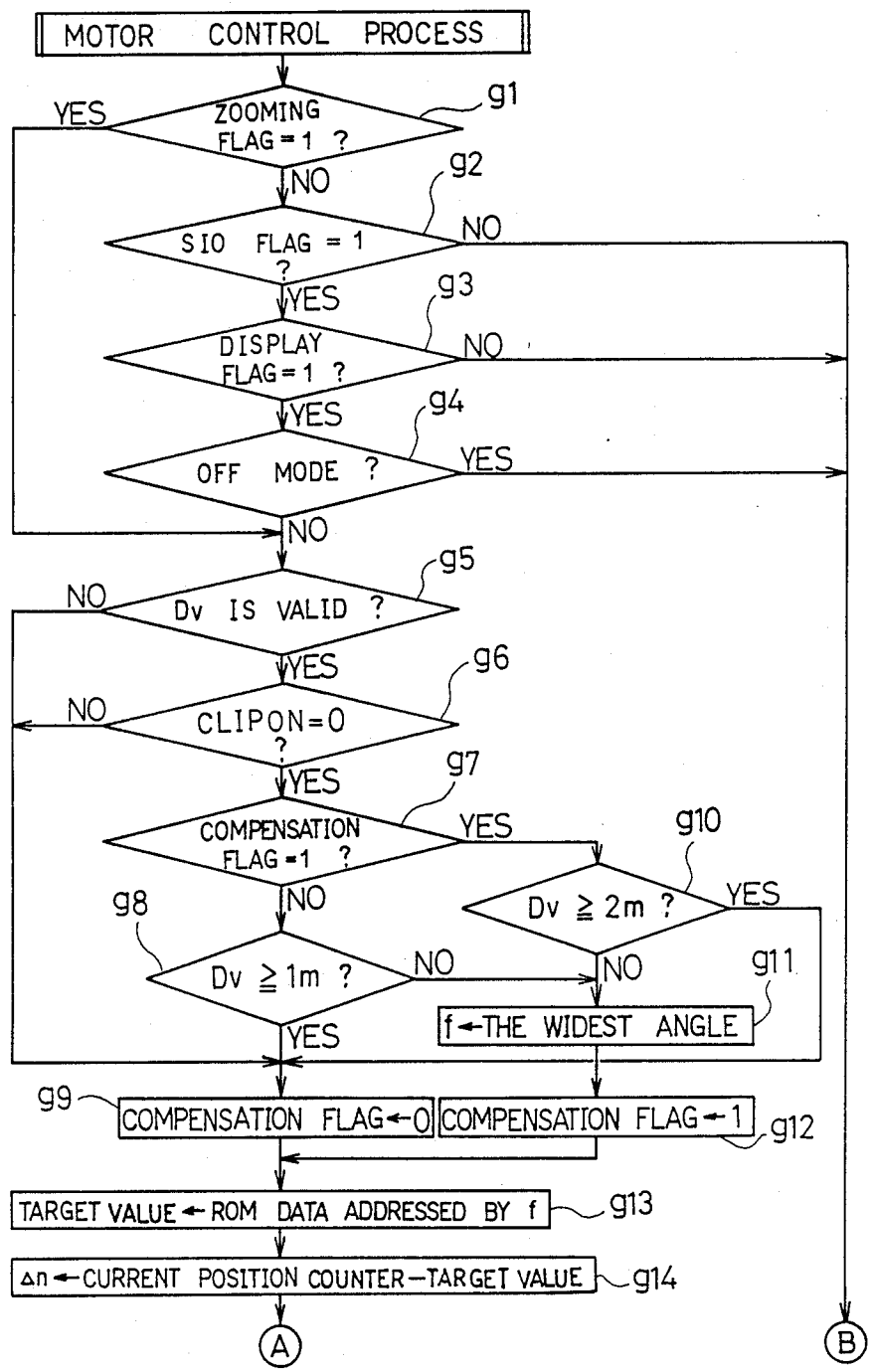
FIGS. 12(a) and 12(b) are a flow chart showing a routine of a motor control of the flashlight.
FIG. 12(c) is an illustration showing a constitution of a zoom.
Figure 13:
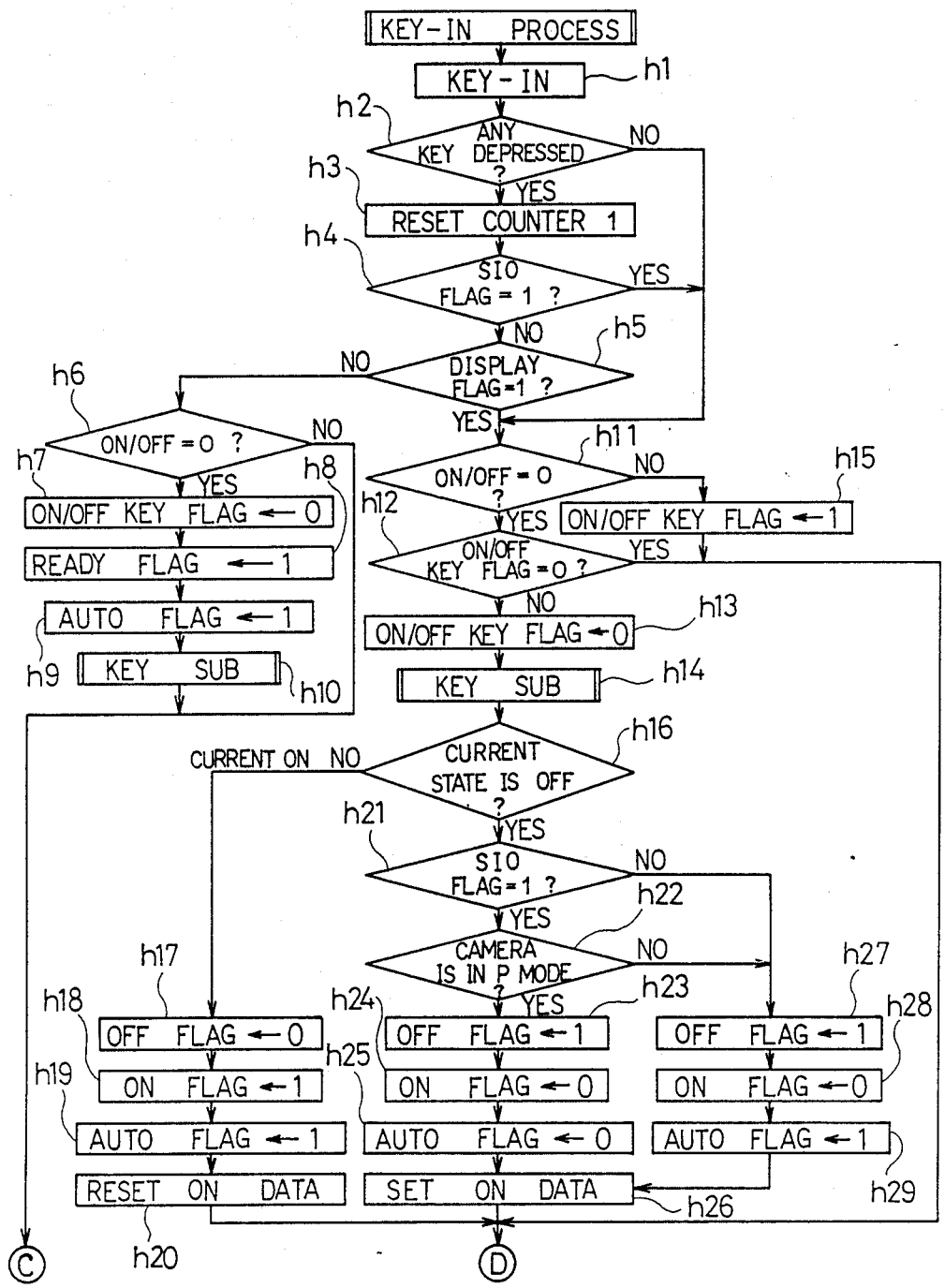
FIGS. 13(a) and 13(b) are a flow chart showing a key-in routine in the flashlight.
Figure 13:
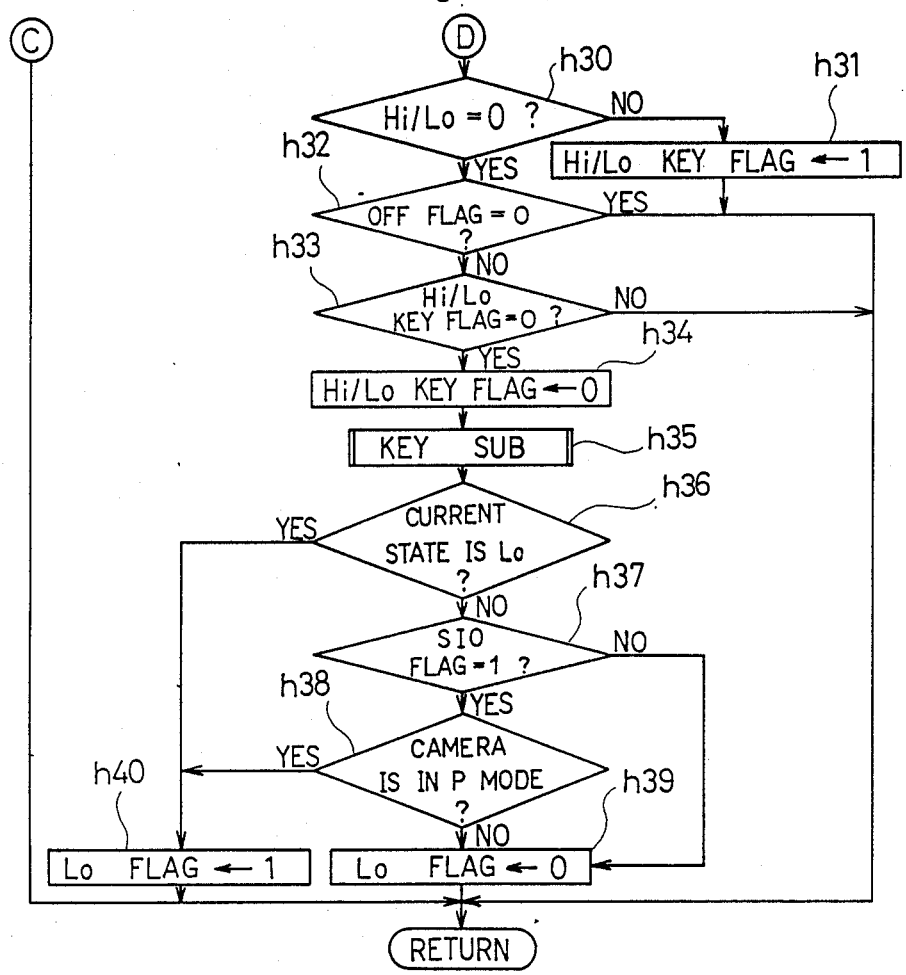
Figure 13:
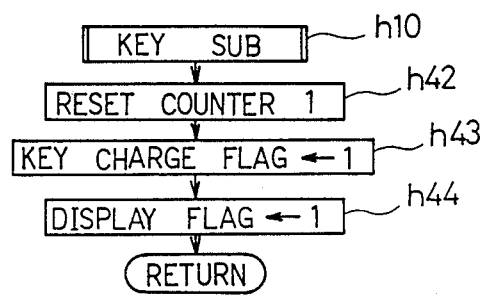

FIG. 11 shows a routine of a charge timing process.

In step f1, the state of the key charge flag is judged. When the key is depressed, this flag is set and when not depressed, this flag is reset. If this flag is reset, the program goes to step f2. In this step, SIO flag is checked, and if communicating with the camera (the SIO flag is set), the program advances to step f3 in which SIO charge flag is checked. If this flag is reset, then this flag is set in next step f4 and reset after finishing communicating with the camera. Accordingly, the flag is set upon starting communicating with the camera and reset upon finishing communicating therewith. In steps f3 and f4, if the start of communicating with the camera is judged, that is, it is judged in step f2 that the SIO flag is set and it is judged in step f3 that SIO charge flag is reset, the full charge flag is reset in step f5, the program execution advancing to the next step.

When the key is depressed in step f1, the key charge flag is reset in f9 and the program advances to step f5. Accordingly, the full charge flag is reset upon depressing the key or upon starting communicating with the camera, thereafter the program goes to step f10. In this step, it is judged whether the full charge flag is set or not. If set, the program goes to step f11 where the terminal OSCST is turned to "H" to stop the oscillation. In step f10, if the full charge flag is reset, the program advances to step f6 where it is judged whether LED1 for AF is lighten or off. If turned off, the program goes to step f7 where it is judged whether zooming (the motor PM is being driven) is active or not. If not, the program goes to step f8 where the oscillation is started by turning the terminal OSCST to "L". If LED1 for AF is lighten or the zooming is active, the oscillation is stopped in f11.

FIGS. 12(a) to 12(c) show a routine and an operation view of a motor control.

In step g1, it is judged where zooming is active or not. If not zooming, the state of SIO flag is judged in step g2. If in step g2 the flag is set, the program advances to g3. In step g3, the state of the display flag is judged and if the flag is set, the program goes to step g4. In this step, it is judged whether or not the flash mode is set to the illumination mode. If it is the illumination mode, the program goes to step g5.

In abovementioned step g1, if zooming, the program goes to step g5, and on the other hand if the SIO flag is reset, the display flag is not set, or the unillumination mode is set, the program advances to step g21. In step g5, it is judged whether the distance data is valid or not according to AF information, and if valid, it is judged whether the flash is correctly positioned toward an object or not in step g6. If correctly positioned, the state of the compensation flag is checked in step g7. Here, this flag is turned to "1" during the operation of the short range compensation. If the short range compensation mode (the compensation flag being set), the program goes to step g10. If not, the distance data Dv transferred from the camera is judged. For example, if its value is less than or equal to 1 m, the program advances to step g11 where the focal length f is set to the widest angle. Hereby, the illuminating angle is set to the widest angle as described later. Next, in step g12, the compensation flag is set which shows the compensation operation is active. In step g10, the distance data is judged and for example, if its value is more than or equal to 2 m, the program advances to step g9 where the compensation flag is reset.

Accordingly, if not in the short range mode, the short range compensation mode is selected when the photographic distance becomes less than or equal to 1 m. If the short range, this mode is released when the photographic distance becomes more than or equal to 2 m. Hereby, solved is such a trouble action that the lens moves forward and backward when the distance signal fluctuates about 1 m.

In step g13, the target value stored in the ROM data addressed by the focal length f is loaded. The ROM data includes the position data (the pulse number) of the reflector, which is driven for setting the illuminating angle according to the focal length f, from the position where a panel detecting switch PDETSW is turned on (the illuminating angle is set to the widest one). In step g14, the abovementioned target value is subtracted from the contents of the current position counter showing the current position. In step g15, it is judged whether the value $\Delta n$ after this subtraction is "0" or not. If it is "0", the reflector lies at the correct position to be placed, and the program advances to step g21.

In step g15, if $\Delta n$ is not "0", as it is required to drive the motor PM, it is judged whether $\Delta n$ is positive or negative in step g16. Now, since the panel switch PDETSW is turned on at the moment of the widest angle, the moving toward the telephoto side is set to (+) and the moving toward the wide angle is set to (−). If $\Delta n$ is positive, since it is required to move the reflector toward the wide angle side, the preparation for the moving in the negative direction by 1 step is made in step g17. Next, in step g18, 1 is subtracted from the current position counter, and the data determined in step g17 is outputted at the Z port in step g28. Further, after the data is outputted during a predetermined duration in step g29, the output at the port Z is stopped in step g30, then the zooming flag is set in step g31.

Step g19 is a routine performed when Δn is negative, wherein the data for moving in the (+) direction is set like as said motor driven to (−), and 1 is added to the current position counter in step g20, and the motor is driven in steps g28, g29, and g30, the program advancing to step 31.

In step g21, it is judged whether the focal length f is set to the widest angle or not. If the widest angle, it is judged whether the panel switch (PDETSW; see FIG. 12(c)) is turned on or not in step g22. If the panel switch is not turned on, the motor is driven in the (−) direction until said switch turns on in steps g25, g26, and g27. If said switch turned on, the output at the Z port is set "0" in step g23, thereby the motor PM is stopped, and the current position counter is set "0" in step g24, and the zooming flag is reset in step g32. In step 21, if the focal length is not the widest angle, the zooming flag is reset in step g32, and the program returns.

FIGS. 13(a), 13(b), and 13(c) show routines of a key-in.

In step h1, the state of the key-in is inputted, and it is judged whether any key is depressed or not in step h2. If any one of the keys is depressed, the counter 1 is reset in step h3 and the state of the SIO flag is judged in step h4. If not under communication with the camera (the SIO flag is reset), the state of the display flag is judged in step h5. If the display flag is not set, the state of the ON/OFF (SW1) key is checked in h6. If the ON/OFF key (SW1) is depressed, the flag designates the depressed ON/OFF key is reset in step h7. Then the READY flag for displaying is set in step h8, and the AUTO flag is set in step h9 (the display is to be put out). Step h10 is a subroutine shown in FIG. 13(c). The counter 1 is reset in step h42 in FIG. 13(c), the key charge flag and the display flag are set in steps h43 and h44, and the program returns.

Further, if the ON/OFF key is not depressed in step h6, the program returns directly. If no key is depressed in step h2, if under communication with the camera (SIO flag is set), or if the display flag is set in step h5, the program goes to step h11 where it is judged whether the ON/OFF key is depressed or not. If not depressed, the ON/OFF key flag is set in step h15 and the process (h12-h14, h16-h29) of the ON/OFF key is skipped, then the program advances to step h30. If the ON/OFF key is depressed, the state of said key is judged in step h12. If not depressed at the last time, the program advances to step h13 and if depressed at the last time, it means the ON/OFF key being kept depressed and thus the program skips the routine of the ON/OFF key to advance to step h30.

In step h12, if it is judged the ON/OFF key has just been depressed, the ON/OFF key flag is reset in step h13 and said key subroutine is called in step h14. In step h16, the current illumination mode is judged and if the illumination mode is set, the flags for displaying are set/reset, that is, the OFF flag for lighting the OFF display is reset in step h17, the ON flag for the ON display, and the AUTO flag for the AUTO display are set in steps h18 and h19. In step h20, the data, which indicates that the flash mode is illumination mode and is transferred to the camera, is reset.

In step h16, if the unillumination mode is set now, program advances to step h21 where the SIO flag is checked. If under communicating with the camera (SIO flag is set), the exposure control mode is judged in step h22. If it is P mode, wherein illumination or unillumination is determined on the camera signal, the OFF flag is set in step h23, the ON flag and the AUTO flag are reset in steps h24 and h25. On one hand, if not under communicating with the camera (SIO flag is reset), or if not in the P mode though the microcomputer is under communicating with the camera, the OFF flag and the AUTO flag are set in steps h27 and h29, and the ON flag is reset in h28. After the flags are set/reset, the data indicating that the flash mode is illumination mode is set h26.

Accordingly, when the ON/OFF key is depressed under the illumination mode, that is, in the unillumination mode, the LED3 for displaying "OFF" is turned on and the LED2 for displaying "ON" and the LED6 for displaying "AUTO" are turned off. In case that the ON/OFF key is depressed under the unillumination mode, that is, in the illumination mode, when the exposure control mode is P, the LED3 is turned off and the LED2 and LED6 are turned on, when the exposure control mode is not P, the LED3 and LED6 are turned off and the LED2 is turned on.

In step h30, it is judged whether the Hi/Lo key is depressed or not, and if not depressed, the flag for the Hi/Lo key is set in step h31, and the program returns. If depressed, the flash mode is judged in step h32 and if it is in unillumination mode (OFF), the program execution skips the process (h33-h40) of the Hi/Lo key to return. On the other hand, if it is not in illumination mode, the state of the flag for the Hi/Lo key is judged in step h33. If it is depressed at the last time, it means the Hi/Lo key being kept depressed, the program returns. If it is released at the last time, it means the Hi/Lo key has just been depressed, the flag for the Hi/Lo key is reset in step h34 and the key subroutine as described above is performed in step 35.

In step h36, current condition of the illumination amount is judged. If Lo mode, the Lo flag for the Lo display is set in step h40, thereafter the program returns If Hi mode in step h36, the SIO flag is checked in step h37. If the SIO flag is set, it is detected the exposure control mode in step h38. If P mode, the Lo flag is set at step h40. Therefore, in P mode, the illumination amount is not limited. If not P mode, the Lo flag is reset in step h39. If the SIO flag is reset in step h37, the Lo flag is reset in step h39, too. Thereafter, the program returns. Accordingly, when the Hi/Lo key is depressed under the Lo mode, that is, in the Hi mode, or when the exposure mode of the camera is P mode, the LED4 for displaying "Lo" is turned off. In case that the Hi/Lo key is depressed under the Hi mode, that is, in the Lo mode, when the SIO flag is reset or when the exposure control mode is not P mode, the LED4 is turned on.

Figure 14:
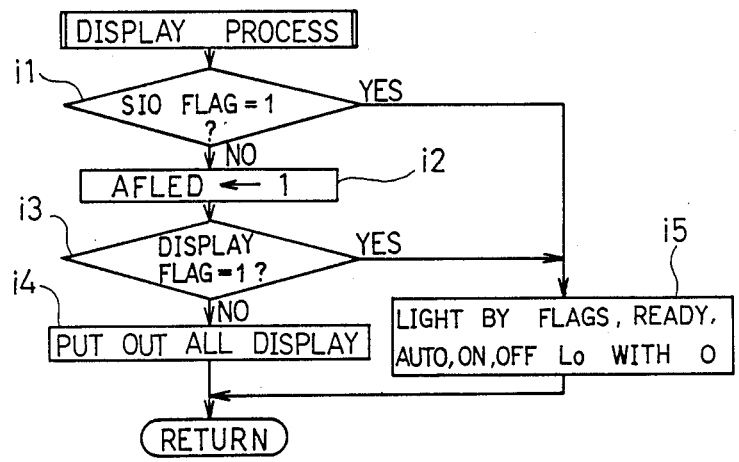
FIG. 14 is a flow chart showing a display process in the flashlight.

FIG. 14 shows a routine of the display process

In step i1 the SIO flag is judged and if under communicating with the camera (the SIO flag is set), the displays are performed depending on the flags for displaying as described above in step i5. Here, "0" causes the display to illuminate. If not under communicating with the camera (the SIO flag is reset), the terminal AFLED is turned "1", then the LED1 for AF is put out. This is provided for the purpose of making the LED1 for AF to put out, in case the flash device is detached after inputting the signal for illuminating the LED1 for AF from the camera. In step i3 the state of the display flag is judged. If the display flag is set, the displays are performed as described above in step i5, and if the display flag is reset, all the display is put out, and the program returns.

Figure 15:
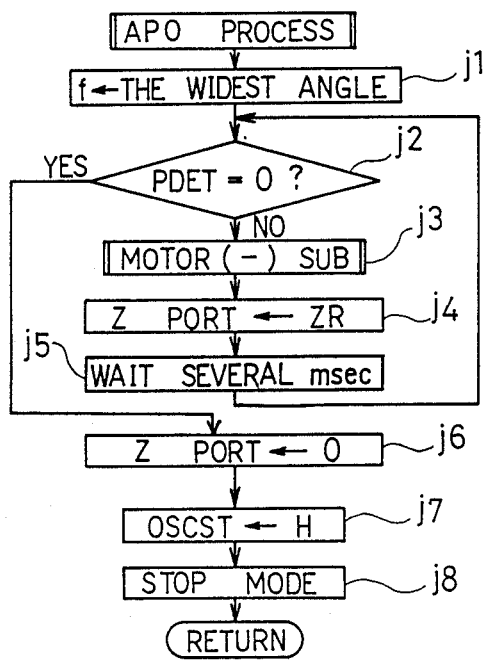
FIG. 15 is a flow chart showing a routine of a auto power off process in the flashlight.
Figure 16:
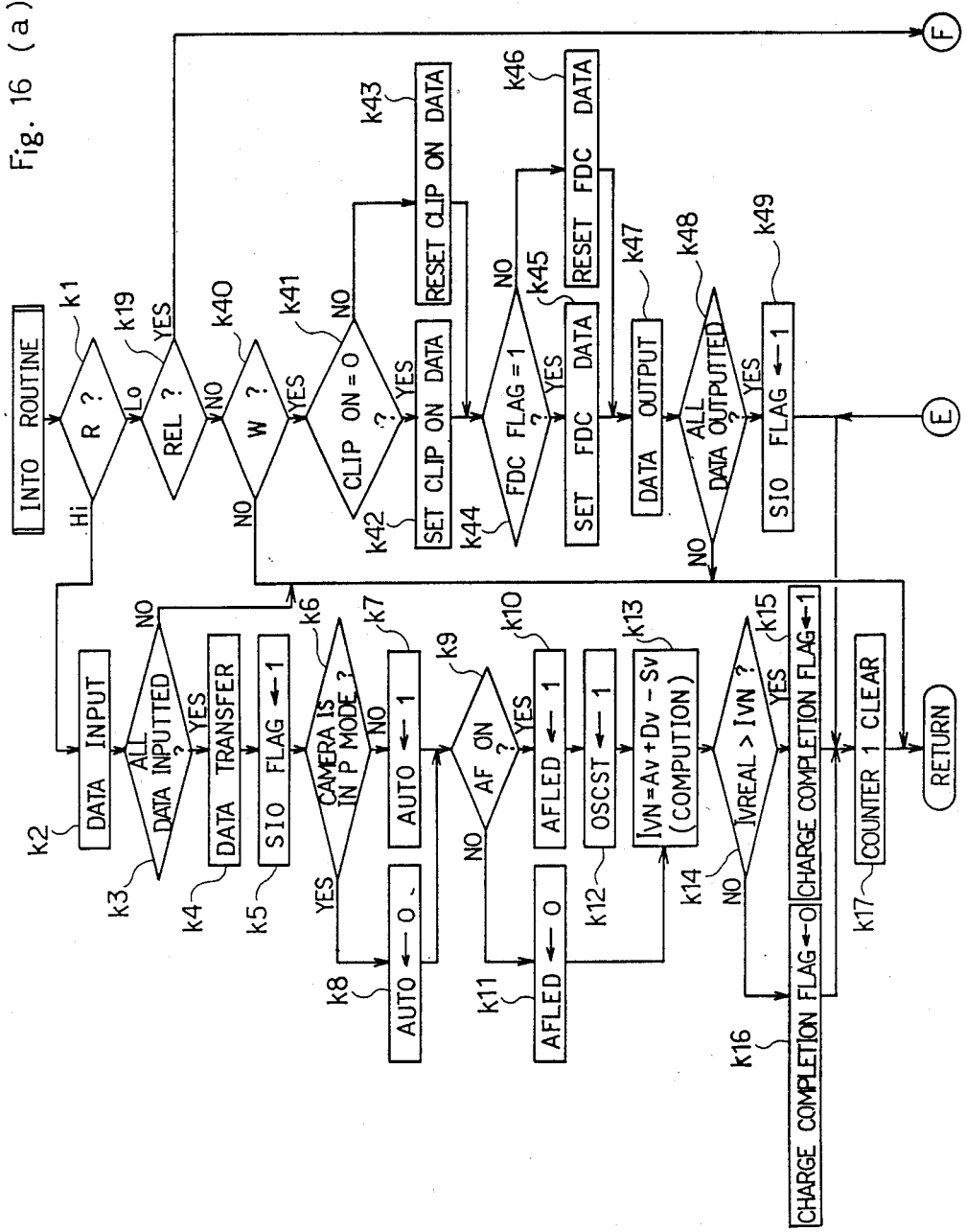
FIGS. 16(a) and 16(b) are a flow chart showing an interruption routine in the flashlight.
Figure 16:
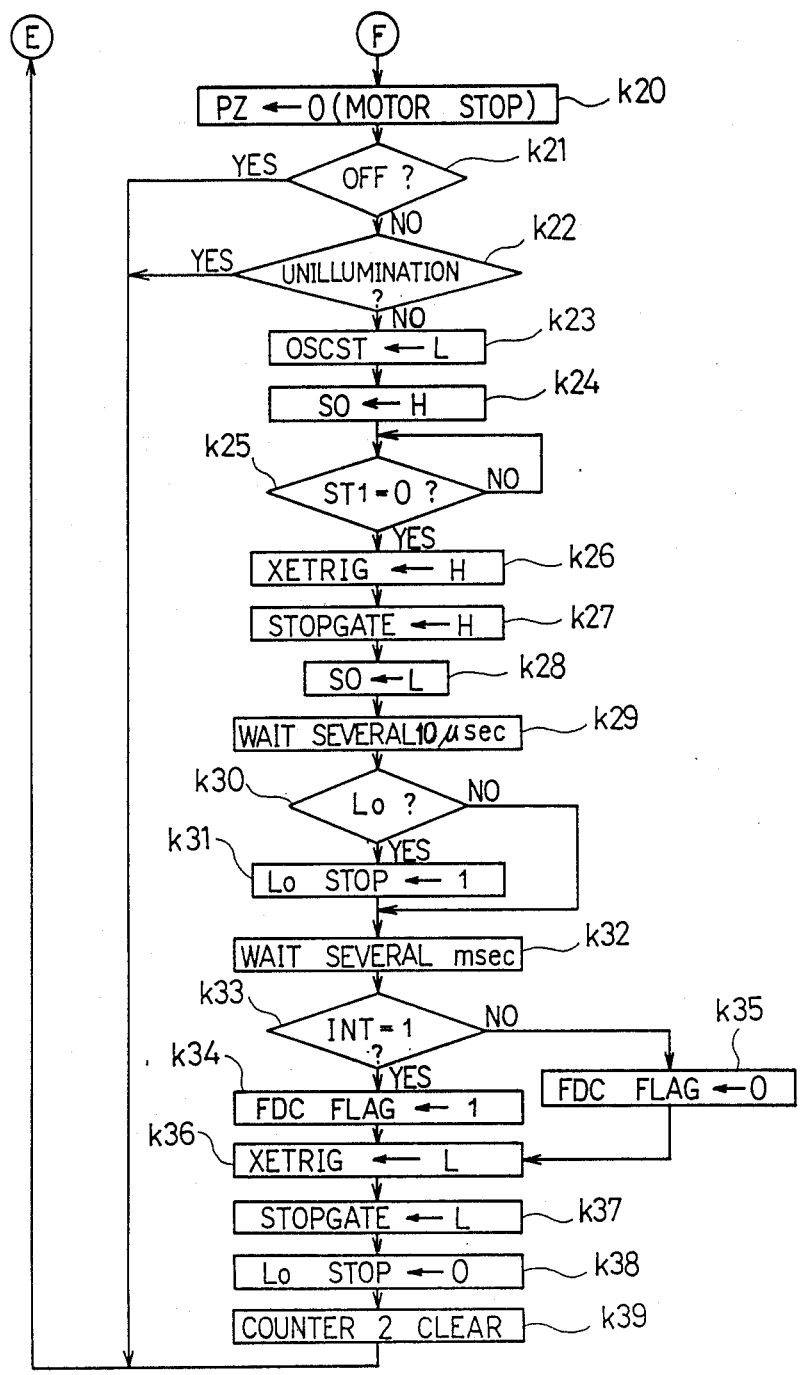

FIG. 15 shows a routine of the auto power off (APO) process.

In step j1, the focal length f is set the widest angle and then the reflector is moved to the position for the widest angle by driving the motor PM until the panel switch is turned on in steps j2, j3, j4, and j5 as described above. This operation prevents from the disadvantage as follows. The disadvantage is that if the shutter of the camera is suddenly released under the auto power off condition of the flash, the pictures taken in such a case have unevenness because of being not in time for setting the illuminating angle. When illuminating angle is set the widest angle, the program goes to step j6 where "0" is outputted form the Z port to stop the motor PM. In step j7 the terminal OSCST is turned to "H" to stop the oscillation and in step j8 microcomputer FLMC enters the stop (STOP) mode where the consumption of the electric current is very little, and returns.

FIGS. 16(a) and 16(b) show an interrupt routine.

When the terminal INT is turned from "L" to "H" under the interruption being enable, the program executes the interrupt routine even if it executes any step of the abovementioned routine. The terminal INT is turned from "L" to "H" at the time when the pulse for identifying the ST3 signal mode is inputted as described above. In step k1, it is judged whether the terminal R (READ) is "H" or not and if it is "H", the program advances to step k2. This is the mode for transferring signals from the camera to the flash. In step k2 the data of the camera is inputted and in step k3 it is confirmed whether all data has been inputted or not. Hereby, even if the flash is suddenly detached under communicating with the camera, the inputted data is not affected. If all data is inputted, in step k4 the data is transferred to be stored in a memory. All the signals stored in the memory are read out when they are used. Then the ISO flag is set in step k5. In step k6 it is judged whether the camera is in P mode or not. If in P mode, the AUTO flag is reset in step k8 and if not in P mode, the AUTO flag is set in step k8.

Next, in step k9 it is judged whether a signal for demanding an auxiliary illuminator is outputted or not. If the demand signal AFON is outputted, the auxiliary illuminator LED1 is illuminated in step k10 and if not outputted, if is put out in step k11. After LED1 for AF is illuminated, the oscillation is stopped in step k12 by turning the terminal OSCST to "H".

Next, the illumination amount $I_{VN}$ ($I_{VNeed}$) required by the camera is computed in step k13. $I_{VN}$ is computed by the following formula:

$$I_{VN} = Av + Dv - Sv$$

where said formula is represent by apex value, and Av is an aperture value, Dv is a distance value, and Sv is a film sensitivity value.

Further, in step k14, $I_{VN}$ is compared with $I_{VREAL}$, and if $I_{VREAL}$, that is, the illumination amount of the capacitors C5 and C6 becomes more than the illumination amount required by the camera, the charge completion flag is set in step k15, and if less than, it is reset in step k16. In step k17 the counter 1 is cleared. Then the program returns.

If the terminal R is low in step k1, then the program goes to step k19. In step k19, it is judged whether the terminal REL is "H" or not, and if it is "H", the program advances to step k20. Here, if the motor is driven, it is once stopped. In step k21 the flash mode is judged, and in step k22 it is judged whether or not the illumination signal is outputted from the camera. If not in OFF mode and the illumination signal is produced from the camera, the program advances to step k23 and if except those conditions, it advances to step k17. In step k23 the oscillation gets started by turning the terminal OSCST to "L". Since when the shutter of the camera is suddenly released a certain time after the capacitors were fully charged, there is a fear that the voltage level of the gate of the IGBTQ5 is low because of the leak of the capacitor, the oscillation (charging operation) is started upon the release of the shutter.

In step k24, a terminal SO is turned to "H". This operation is for the purpose of transferring the signals ("L" level) for starting the illumination to the light metering circuit LMC of the camera as described above. In step k25 it is judged whether a terminal ST1 is "L" or not and if it is turned to "L", the terminal XETRIG is turned to "H" so as to start the illumination. In step k27 STOPGATE is turned to "H", thereby a terminal ST3 becomes acceptable to the flash stop signal. In step k28 the terminal SO is turned to "L" so that the terminal ST2 may be turned to "L" as a signal for starting the light metering of the camera. In step k29, waiting time is passed in order to limit the illumination amount (Lo illumination) and in step k30 it is judged whether it is in Lo mode or not. If Lo mode, a terminal LoSTOP is turned to "H", thereby the illumination being stopped.

In step k32, after a predetermined time is passed, it is judged whether the terminal INT is "1" or not. This operation is for the purpose of checking the stop signal at the terminal ST3 from the camera. If the stop signal is produced thereat, in step k34 set is the FDC flag designating the completion of the illumination adjustment and if not produced thereat, it is reset in step k35. In step k36 XETRIG is turned to "L", thereby the illumination is stopped and in step k37 STOPGATE is turned to "L", thereby the stop signal is not accepted. In step k38 LoSTOP signal is reset and in step k39 the counter 2 is cleared, thereby FDC signal is produced for a predetermined time as described above.

A signal transfer from the flash to the camera is processed in steps from k40 to k49. In step k40, it is judged whether the terminal W (WRITE) is "H" or not. If it is "H", the program advances to k41. In this mode, signals are transferred from the flash to the camera. In step k41 it is judged whether the clip-on is detected or not. If detected (the switch SW3 is ON), the program goes to step k42, and if not detected (the switch SW3 is OFF), it goes to step k43. In step k42, the data indicating that the flash is correctly positioned is stored in the memory for outputting data. In step k43, data indicating that the flash device is not correctly positioned is stored in the memory for data outputting. In step k44, judged is the state of the flag FDC indicating that the flashlight is correctly emitted. If the flag FDC is set, the program goes to step k45, and if not set, it goes to step k46. In step k45, set is the data of FDC and in step k46 reset. In step k47, data is serially outputted from the flash to the camera as described above. In step k48 it is judged whether all the data is outputted or not. If outputted, the abovementioned SIO flag is set in step k49. If not outputted, it means that the flash device is removed from the camera, or there is something wrong in the camera, and the SIO flag is not set, the program returns.

Now, in the abovementioned embodiment, the output of the boost circuit (DC/DC converter circuit) is rectified by the diode D3 and this rectified output is used to charge the capacitors C5 and C6 through the diode D4 or the photo-thyristor PHThr, and the smoothing capacitor C4 is connected to the output terminal of the diode D3. However, said diode D3 and the smoothing capacitor C4 can be omitted by modifying the method for detecting the voltage level of the capacitors C5 and C6 into the method as described just later. That is, the output voltage of the converter circuit is always detected by the terminal Hv of the microcomputer FLMC, and it is sufficient to adopt only the (+) voltage as the detected data (the output of the converter circuit is due to shifting in ± direction).

What is claimed is:

1. A system for controlling an illuminating angle of a flashlight, the system comprising;
   a stepping motor,
   means for controlling the illuminating angle of a flashlight by driving the stepping motor, and
   means for controlling a driving amount of the stepping motor.

2. A system according to claim 1, further comprising;
   a flashlight illumination panel, and
   a reflector,
   wherein said illuminating angle control means controls a relative position between the panel and the reflector.

3. A system according to claim 2, wherein said panel is a Fresnel panel.

4. A system according to claim 2, wherein said illuminating angle control means includes means for moving the reflector.

5. A system according to claim 1, further comprising;
   means for inputting information about an illuminating angle of the flashlight, wherein said illuminating angle control means controls a driving amount of the stepping motor in response to the inputted information.

6. A system according to claim 5, wherein the information about said illuminating angle is a focal length.

7. A system according to claim 5, wherein the information about an illuminating angle is a flash starting signal for making the flash device start its operation.

8. A system according to claim 7, wherein said illuminating angle control means set an illuminating angle of the flashlight to a predetermined angle when the flash starting signal is inputted.

9. A system according to claim 8, wherein said predetermined illuminating angle is the widest illuminating angle.

10. A system according to claim 5, wherein the information about said illuminating angle is a flash stopping signal for making the flash device stop its operation.

11. A system according to claim 10, wherein said illuminating angle control means sets the illuminating angle of the flashlight to a predetermined angle when the flash stopping signal is inputted.

12. A system according to claim 11, wherein the predetermined illuminating angle is the widest illuminating angle.

13. A system according to claim 10, wherein said flash stopping signal is a auto power off signal produced when no operation is performed during the predetermined time.

14. A system according to claim 13, wherein said illuminating angle control means sets the illuminating angle to a predetermined angle when said auto power off signal is inputted.

15. A system according to claim 14, wherein said predetermined illuminating angle is the widest illuminating angle.

16. A system according to claim 5, wherein said information about the illuminating angle is information about a photographing distance.

17. A system according to claim 16, further comprising; means for judging whether a photographing distance is shorter than a predetermined distance or not, wherein said illuminating angle control means sets the illuminating angle of the flashlight to a predetermined angle when the photographing distance is shorter than the predetermined distance.

18. A system according to claim 17, wherein said predetermined illuminating angle is the widest illuminating angle.

19. A system for controlling an illuminating angle of a flashlight, the system comprising;
   means for controlling the illuminating angle of the flashlight,
   means for producing a signal when no operation is performed during a predetermined time, and
   means for setting the illuminating angle of the flashlight to a predetermined angle when said signal is produced.

20. A system according to claim 19, wherein said predetermined illuminating angle is the widest illuminating angle.

21. A system according to claim 19, further comprising;
   a flashlight illumination panel, and
   a reflector,
   wherein said illuminating angle control means controls a relative position between the panel and the reflector.

22. A system according to claim 21, wherein said panel is a Fresnel panel.

23. A system according to claim 21, wherein said illuminating angle control means includes means for moving the reflector.

24. A system according to claim 19, further comprising;
   means for inputting information about the flashlight illuminating angle, wherein said illuminating angle control means controls in response to the inputted information.

25. A system according to claim 24, wherein said information is an information about a focal length of a photographing lens.

26. A system according to claim 19, wherein means for controlling said illuminating angle includes;
   a stepping motor,
   means for controlling a driving amount of the stepping motor, and
   means for controlling the illuminating angle of the flashlight by driving the stepping motor.

* * * * *